US012479205B2

(12) United States Patent
Murayama

(10) Patent No.: US 12,479,205 B2
(45) Date of Patent: Nov. 25, 2025

(54) INFORMATION PROCESSING APPARATUS

(71) Applicant: SEIKO EPSON CORPORATION, Tokyo (JP)

(72) Inventor: Toshiro Murayama, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 208 days.

(21) Appl. No.: 18/150,169

(22) Filed: Jan. 4, 2023

(65) Prior Publication Data

US 2023/0211605 A1  Jul. 6, 2023

(30) Foreign Application Priority Data

Jan. 5, 2022 (JP) ................. 2022-000378

(51) Int. Cl.
   *B41J 2/045*  (2006.01)
   *G06F 3/12*  (2006.01)

(52) U.S. Cl.
   CPC ....... *B41J 2/04588* (2013.01); *B41J 2/04581* (2013.01); *G06F 3/1256* (2013.01)

(58) Field of Classification Search
   CPC ........................................... B41J 2/045
   See application file for complete search history.

(56) References Cited

U.S. PATENT DOCUMENTS

| 5,914,732 | A | * | 6/1999 | Sakai | ................ | B41J 2/355 |
| | | | | | | 347/154 |
| 2006/0077404 | A1 | * | 4/2006 | Usui | ................ | B41J 2/2128 |
| | | | | | | 358/3.11 |
| 2007/0057979 | A1 | * | 3/2007 | Gardner | ................ | B41J 2/2142 |
| | | | | | | 347/5 |
| 2008/0180473 | A1 | * | 7/2008 | Gardner | ................ | B41J 29/393 |
| | | | | | | 326/37 |
| 2010/0118075 | A1 | * | 5/2010 | Miyazawa | ................ | B41J 2/04593 |
| | | | | | | 347/10 |
| 2021/0229420 | A1 | | 7/2021 | Murayama et al. | | |

FOREIGN PATENT DOCUMENTS

JP  2021-115725  8/2021

\* cited by examiner

*Primary Examiner* — Shelby L Fidler
(74) *Attorney, Agent, or Firm* — WORKMAN NYDEGGER

(57) ABSTRACT

An information processing apparatus used to determine a waveform of a drive pulse applied to a drive element provided in a liquid discharge head for discharging a liquid includes a first reception unit that receives an input of first information for determining a first waveform as the waveform of the drive pulse, a second reception unit that receives an input of second information for determining a second waveform different from the first waveform, as the waveform of the drive pulse, and a third reception unit that receives an input of third information regarding whether or not to adjust at least a portion of the second waveform to be identical to an element of the first waveform, the third information being used when the second waveform is determined.

13 Claims, 26 Drawing Sheets

FIG. 7

```
┌─ EVALUATION HEAD/ENVIRONMENTAL SETTING ──────┐── G1
│                                              │
│   NOZZLE RESOLUTION                          │
│G1-1──▶ [ 300 dpi      ▾ ]                    │
│                                              │
│   COM                                        │
│G1-2──▶ [ PLURAL       ▾ ]                    │
│                                              │
│   EVALUATION TEMPERATURE                     │
│G1-3──▶ ☐ EXECUTION OF TEMPERATURE CONTROL    │
│          (CHECK IN CASE OF EXECUTION)        │
│                                              │
│   REFERENCE VALUE      ERROR MARGIN          │
│                      + [ 0.5 ] °C            │
│G1-4──▶ [ 25.0 ] °C   - [ 0.5 ] °C            │
│                                              │
│   DETECTION NOZZLE                           │
│G1-5──▶ [ 0 (CENTER)   ▾ ]                    │
│                                              │
│   STORAGE FOLDER                             │
│G1-6──▶ [ 1            ▾ ]                    │
│                                              │
└──────────────────────────────────────────────┘
```

FIG. 10

| Tc | DISCHARGE AMOUNT | DISCHARGE RATE | FREQUENCY CHARACTERISTIC | SCATTERING PICTURE | STABILITY |

MEASUREMENT SETTING

T2-1, T2-2, T2-3, T2-4, T2-5, T2-6, G4

T5 — Pattern 1 | Pattern 2 | Pattern 3 | Pattern 4 | Pattern 5

G4-8: NUMBER OF NOZZLES: 25 PIECES

G4-9: DISCHARGE PATTERN SETTING [ SEARCH ]

G4-10: NUMBER OF TIMES OF DISCHARGE: 50000 shot

G4-11: FREQUENCY DESIGNATION METHOD: [MAX VALUE] [HALF VALUE OF MAX (MAX/2)] [DESIGNATED VALUE]

G4-12: FREQUENCY: ___ kHz

G4-13: Vh RANGE [V]: Start 20 TO End 24 every Step 2

G4-14: CALCULATION METHOD: [AVERAGE VALUE] [MAXIMUM VALUE] [MINIMUM VALUE]

G4-15: NUMBER OF REPETITIONS: 3 TIMES

FIG. 22

| | | | | | | | G5 |
|---|---|---|---|---|---|---|---|

WAVEFORM SETTING

T19 → Pattern A | Pattern B | Pattern C | Pattern D | Pattern E | Pattern F

G5-1
DROPLET SIZE         WAVEFORM FILE
Large  ▽                                                              SEARCH G5-2
SP SETTING
                                                        SEARCH    ☐ LMS MIXED G5-3
WAVEFORM ADJUSTMENT DETAIL
NONE                                                                      ▽

G5-4
TARGET VALUE SETTING (Target No.)   PROPER VOLTAGE REFERENCE SOURCE
1  ▽                                SELF-WAVEFORM          ▽       OFF T20 → DISCHARGE AMOUNT | DISCHARGE RATE | FREQUENCY CHARACTERISTIC | SCATTERING PICTURE | STABILITY     ◁ ▷

G5-5
☑ MEASUREMENT POSSIBLE OR NOT (CHECK IN CASE OF MEASUREMENT)

G5-6
NUMBER OF EXECUTION CASES
1  ▽

T20 → Case 1 | Case 2 | Case 3 | Case 4 | Case 5

G5-7
Pattern No.  1     CONFIRM

FIG. 23

| | | | | | | | G5 |
|---|---|---|---|---|---|---|---|

WAVEFORM SETTING

T19 → Pattern A | Pattern B | Pattern C | Pattern D | Pattern E | Pattern F

G5-1
DROPLET SIZE          WAVEFORM FILE
Large                                                              SEARCH G5-2
SP SETTING
                                                      SEARCH   ☐ LMS MIXED

G5-3
WAVEFORM ADJUSTMENT DETAIL
NONE

G5-4
TARGET VALUE SETTING (Target No.)    PROPER VOLTAGE REFERENCE SOURCE
1                                    SELF-WAVEFORM                        OFF T20 → DISCHARGE AMOUNT | DISCHARGE RATE | FREQUENCY CHARACTERISTIC | SCATTERING PICTURE | STABILITY    ◁ ▷

G5-8
☑ MEASUREMENT POSSIBLE OR NOT (CHECK IN CASE OF MEASUREMENT)

G5-9
NUMBER OF EXECUTION CASES
1

T22 → Case 1 | Case 2 | Case 3 | Case 4 | Case 5

G5-10
Pattern No.  1     CONFIRM     NUMBER OF REPETITIONS  1  TIMES

FIG. 24

| | WAVEFORM SETTING | | | | | | G5 |
|---|---|---|---|---|---|---|---|

T19 → Pattern A | Pattern B | Pattern C | Pattern D | Pattern E | Pattern F

G5-1
DROPLET SIZE    WAVEFORM FILE
[Large ▽]    [                    ] [SEARCH]

G5-2
SP SETTING
[                              ] [SEARCH]   ☐ LMS MIXED

G5-3
WAVEFORM ADJUSTMENT DETAIL
[NONE ▽]

G5-4
TARGET VALUE SETTING (Target No.)    PROPER VOLTAGE REFERENCE SOURCE
[1 ▽]                                 [SELF-WAVEFORM ▽]         [OFF]

T20 → DISCHARGE AMOUNT | DISCHARGE RATE | FREQUENCY CHARACTERISTIC | SCATTERING PICTURE | STABILITY    ◁ ▷

G5-11
☑ MEASUREMENT POSSIBLE OR NOT (CHECK IN CASE OF MEASUREMENT)

G5-12
NUMBER OF EXECUTION CASES
[1 ▽]

T23 → Case 1 | Case 2 | Case 3 | Case 4 | Case 5

G5-13
Pattern No. [1]    [CONFIRM]    NUMBER OF REPETITIONS [1] TIMES

FIG. 25

| | WAVEFORM SETTING | | | | | | G5 |
|---|---|---|---|---|---|---|---|

T19 → Pattern A | Pattern B | Pattern C | Pattern D | Pattern E | Pattern F

G5-1
DROPLET SIZE   WAVEFORM FILE
[Large ▽]   [_____]   [SEARCH]

G5-2
SP SETTING
[_____]   [SEARCH]   ☐ LMS MIXED

G5-3
WAVEFORM ADJUSTMENT DETAIL
[NONE ▽]

G5-4
TARGET VALUE SETTING (Target No.)   PROPER VOLTAGE REFERENCE SOURCE
[1 ▽]   [SELF-WAVEFORM ▽]   [OFF]

T20 → DISCHARGE AMOUNT | DISCHARGE RATE | FREQUENCY CHARACTERISTIC | SCATTERING PICTURE | STABILITY   ◁ ▷

G5-14
☑ MEASUREMENT POSSIBLE OR NOT (CHECK IN CASE OF MEASUREMENT)

G5-15
NUMBER OF EXECUTION CASES
[1 ▽]

T24 → Case 1 | Case 2 | Case 3 | Case 4 | Case 5

G5-16
ITEM    pattern No.    NUMBER OF REPETITIONS [1] TIMES

IMAGE CAPTURING RANGE    [1]    [CONFIRM]

VOLTAGE    [1]    [CONFIRM]

DISCHARGE PATTERN    [1]    [CONFIRM]

FREQUENCY    [1]    [CONFIRM]

IMAGE CAPTURING MODE    [1]    [CONFIRM]

FIG. 26

| | WAVEFORM SETTING | | | | | | G5 |
|---|---|---|---|---|---|---|---|

T19 → Pattern A | Pattern B | Pattern C | Pattern D | Pattern E | Pattern F

G5-1
DROPLET SIZE      WAVEFORM FILE
[Large ▼]         [                    ] [SEARCH]

G5-2
SP SETTING
[                              ] [SEARCH]  ☐ LMS MIXED

G5-3
WAVEFORM ADJUSTMENT DETAIL
[NONE ▼]

G5-4
TARGET VALUE SETTING (Target No.)   PROPER VOLTAGE REFERENCE SOURCE
[1 ▼]                                [SELF-WAVEFORM ▼]         [OFF]

T20 → | DISCHARGE AMOUNT | DISCHARGE RATE | FREQUENCY CHARACTERISTIC | SCATTERING PICTURE | STABILITY |  ◁ ▷

G5-17
☑ MEASUREMENT POSSIBLE OR NOT (CHECK IN CASE OF MEASUREMENT)

G5-18
NUMBER OF EXECUTION CASES
[1 ▼]

T25 → Case 1 | Case 2 | Case 3 | Case 4 | Case 5

G5-19

ITEM        pattern No.              NUMBER OF REPETITIONS [1]  TIMES

VOLTAGE              [1]    [CONFIRM]

DISCHARGE
PATTERN              [1]    [CONFIRM]

FREQUENCY            [1]    [CONFIRM]

IMAGE CAPTURING
MODE                 [1]    [CONFIRM]

INFORMATION PROCESSING APPARATUS

The present application is based on, and claims priority from JP Application Serial Number 2022-000378, filed Jan. 5, 2022, the disclosure of which is hereby incorporated by reference herein in its entirety.

BACKGROUND

1. Technical Field

The present disclosure relates to an information processing apparatus.

2. Related Art

In a liquid discharge apparatus such as an ink jet printer, generally, liquid such as an ink is discharged from a nozzle by applying a drive pulse to a drive element such as a piezoelectric element. Here, the waveform of the drive pulse is determined so that the discharge characteristics of the ink from the nozzle is the desired characteristics.

For example, JP-A-2021-115725 discloses a computer that executes a program for determining the waveform of a drive pulse.

When the waveforms of a plurality of drive pulses are determined by using the program as disclosed in JP-A-2021-115725, the plurality of drive pulses may be switched and applied to the drive element. At this time, when the waveforms of the plurality of drive pulses are independently determined, troubles such as adverse effects of the discharge may occur at the time of switching. Under such circumstances, it is desired to reduce the troubles in determining the waveforms of a plurality of drive pulses and performing evaluations for the determination.

SUMMARY

According to an aspect of the present disclosure, an information processing apparatus is used to determine a waveform of a drive pulse applied to a drive element provided in a liquid discharge head for discharging a liquid. The information processing apparatus includes a first reception unit that receives an input of first information for determining a first waveform as the waveform of the drive pulse, a second reception unit that receives an input of second information for determining a second waveform different from the first waveform, as the waveform of the drive pulse, and a third reception unit that receives an input of third information regarding whether or not to adjust at least a portion of the second waveform to be identical to an element of the first waveform, the third information being used when the second waveform is determined.

BRIEF DESCRIPTION OF THE DRAWINGS

FIG. 7 is a diagram illustrating a display for setting an evaluation environment.

FIG. 10 is a diagram illustrating a display for the measurement setting.

FIG. 22 is a diagram illustrating a display for waveform setting.

FIG. 23 is a diagram illustrating a display for the waveform setting.

FIG. 24 is a diagram illustrating a display for the waveform setting.

FIG. 25 is a diagram illustrating a display for the waveform setting.

FIG. 26 is a diagram illustrating a display for the waveform setting.

DESCRIPTION OF EXEMPLARY EMBODIMENTS

Figure 1:
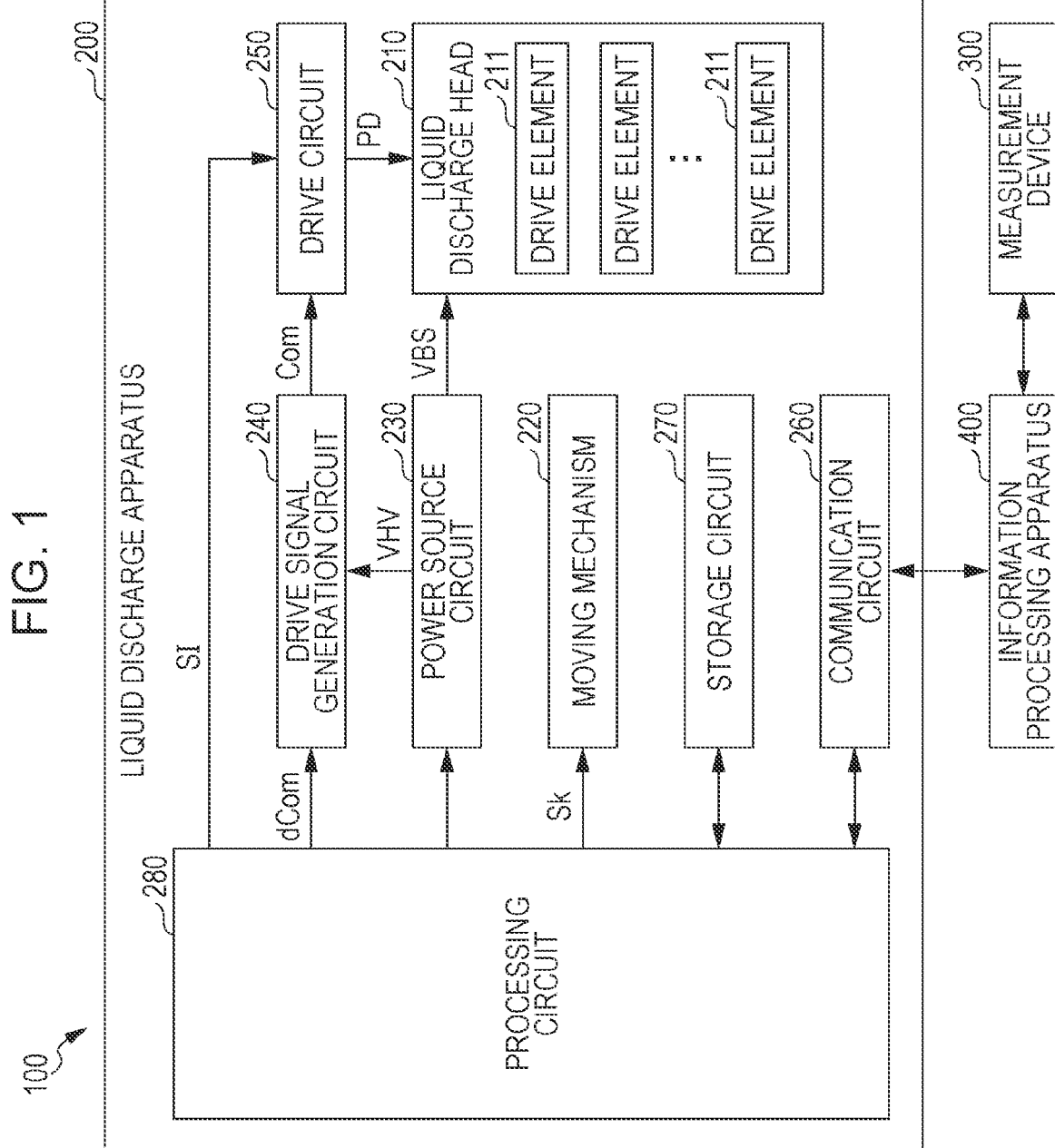
FIG. 1 is a schematic diagram illustrating a configuration example of a system including an information processing apparatus according to a first embodiment.

Preferred embodiments according to the present disclosure will be described below with reference to the accompanying drawings. The dimensions and scale of each portion in the drawings are appropriately different from the actual ones, and some portions are illustrated schematically for easy understanding. The scope of the present disclosure is not limited to the forms unless a description showing that the present disclosure is particularly limited in the following description is made.

1. System Including Information Processing Apparatus

FIG. 1 is a schematic diagram illustrating a configuration example of a system 100 including an information processing apparatus 400 according to a first embodiment. The system 100 determines the waveform of a drive pulse PD used when discharging an ink, which is an example of liquid, and performs evaluation for the determination. In the present embodiment, the system 100 can perform both the determination and the evaluation. The system 100 may be configured to perform only the evaluation. In this case, for example, the determination may be performed by a device separate from the system 100 using the evaluation result.

As illustrated in FIG. 1, the system 100 includes a liquid discharge apparatus 200, a measurement device 300, and an information processing apparatus 400. First, the outline of the above components will be sequentially described below.

1-1a. Liquid Discharge Apparatus 200

The liquid discharge apparatus 200 is a printer that performs printing on a recording medium by an ink jet method. As long as the recording medium is a medium on which the liquid discharge apparatus 200 can perform printing, the recording medium is not particularly limited, and are various types of paper, various types of cloth, and various types of films. The liquid discharge apparatus 200 may be a serial printer or a line printer.

As illustrated in FIG. 1, the liquid discharge apparatus 200 includes a liquid discharge head 210, a moving mechanism 220, a power source circuit 230, a drive signal generation circuit 240, a drive circuit 250, a communication circuit 260, a storage circuit 270, and a processing circuit 280.

The liquid discharge head 210 discharges an ink toward a recording medium. FIG. 1 illustrates a plurality of drive elements 211 as constituent components of the liquid discharge head 210. Although not illustrated, the liquid discharge head 210 includes a cavity for containing ink and a nozzle communicating with the cavity in addition to the drive element 211. Here, the drive element 211 is provided for each cavity, and an ink is discharged from the nozzle corresponding to the cavity by changing the pressure of the cavity. The drive element 211 is, for example, a piezoelectric element that deforms a vibration plate forming a portion of a wall surface of the cavity, or a heater that heats the ink in the cavity. The liquid discharge head 210 may be simply referred to as a "head" below.

In the example illustrated in FIG. 1, the liquid discharge apparatus 200 includes one liquid discharge head 210, but the number of liquid discharge heads may be equal to or more than 2. In this case, for example, two or more liquid discharge heads 210 are unitized. When the liquid discharge apparatus 200 is a serial type, the liquid discharge head 210 or a unit including two or more liquid discharge heads is used so that a plurality of nozzles are distributed over a portion of a recording medium in a width direction. When the liquid discharge apparatus 200 is a line type, a unit including two or more liquid discharge heads 210 is used so that a plurality of nozzles are distributed over the entire range of the recording medium in the width direction.

The moving mechanism 220 changes the relative positions of the liquid discharge head 210 and the recording medium. More specifically, when the liquid discharge apparatus 200 is a serial type, the moving mechanism 220 includes a transport mechanism that transports a recording medium in a predetermined direction, and a moving mechanism that repeatedly moves the liquid discharge head 210 along an axis perpendicular to a transport direction of the recording medium. Further, when the liquid discharge apparatus 200 is a line type, the moving mechanism 220 includes a transport mechanism that transports a recording medium in a direction intersecting with the longitudinal direction of the unit including the two or more liquid discharge heads 210.

The power source circuit 230 receives a supply of power from a commercial power source (not illustrated) and generates various predetermined potentials. The generated various potentials are appropriately supplied to each portion of the liquid discharge apparatus 200. For example, the power source circuit 230 generates a power source potential VHV and an offset potential VBS. The offset potential VBS is supplied to the liquid discharge head 210 and the like. The power source potential VHV is supplied to the drive signal generation circuit 240 and the like.

The drive signal generation circuit 240 is a circuit that generates a drive signal Com for driving each drive element 211 of the liquid discharge head 210. Specifically, the drive signal generation circuit 240 includes, for example, a DA converter circuit and an amplifier circuit. The drive signal generation circuit 240 generates the drive signal Com in a manner that the DA converter circuit converts a waveform designation signal dCom described later from the processing circuit 280, from a digital signal to an analog signal, and the amplifier circuit amplifies the analog signal by using the power source potential VHV from the power source circuit 230. Here, a signal of a waveform actually supplied to the drive element 211 among waveforms included in the drive signal Com is a drive pulse PD. The drive pulse PD will be described later in detail with reference to FIG. 2.

The drive circuit 250 switches whether or not to supply at least a portion of the waveform included in the drive signal Com, as the drive pulse PD for each of the plurality of drive elements 211 based on a control signal SI, which will be described later. The drive circuit 250 is, for example, an integrated circuit (IC) chip such as a transmission gate.

The communication circuit 260 is a communication device communicably connected to the information processing apparatus 400. The communication circuit 260 includes interfaces such as a universal serial bus (USB) and a local area network (LAN), for example. The communication circuit 260 may be wirelessly connected to the information processing apparatus 400 via Wi-Fi, Bluetooth, or the like, or may be connected to the information processing apparatus 400 via a local area network (LAN), the Internet, or the like. Wi-Fi and Bluetooth are registered trademarks.

The storage circuit 270 stores various programs executed by the processing circuit 280 and various types of data such as print data processed by the processing circuit 280. For example, the storage circuit 270 includes one or both semiconductor memories of a volatile memory such as a random access memory (RAM) and a non-volatile memory such as a read only memory (ROM), an electrically erasable programmable read-only memory (EEPROM) or a programmable ROM(PROM). The print data is supplied from the information processing apparatus 400, for example. The storage circuit 270 may be configured as a portion of the processing circuit 280.

The processing circuit 280 has a function of controlling the operation of each portion of the liquid discharge apparatus 200 and a function of processing various types of data. The processing circuit 280 includes, for example, one or more processors such as central processing units (CPUs). The processing circuit 280 may include a programmable logic device such as a field-programmable gate array (FPGA) instead of or in addition to the CPU.

The processing circuit 280 controls the operation of each portion of the liquid discharge apparatus 200 by executing programs stored in the storage circuit 270. Here, the processing circuit 280 generates signals such as the control signals Sk and SI and the waveform designation signal dCom as signals for controlling the operation of each section of the liquid discharge apparatus 200.

A control signal Sk is a signal for controlling driving of the moving mechanism 220. The control signal SI is a signal for controlling driving of the drive circuit 250. Specifically, the control signal SI designates, for each predetermined unit period, whether or not the drive circuit 250 supplies the drive signal Com from the drive signal generation circuit 240 to the liquid discharge head 210 as the drive pulse PD. With such designation, the amount of ink discharged from the liquid discharge head 210 and the like are designated. The waveform designation signal dCom is a digital signal for defining the waveform of the drive signal Com generated by the drive signal generation circuit 240.

1-1b. Measurement Device 300

The measurement device 300 is a device that measures discharge characteristics of the ink from the liquid discharge head 210. Examples of the discharge characteristics include a discharge rate, a discharge angle, a discharge amount, the number of satellites, and stability. The discharge characteristics of the ink from the liquid discharge head 210 may be simply referred to as "discharge characteristics" below.

The measurement device 300 in the present embodiment is an image pickup device that picks up an image of the scattering ink discharged from the liquid discharge head 210. Specifically, the measurement device 300 includes, for example, an imaging optical system and an imaging element. The imaging optical system is an optical system including at least one imaging lens, and may include various optical elements such as a prism, or may include a zoom lens, a focus lens, or the like. The imaging element is, for example, a charge coupled device (CCD) image sensor or a complementary MOS (CMOS) image sensor. The imaging result of the imaging element is input to the information processing apparatus 400, and the information processing apparatus 400 calculates each discharge characteristic by arithmetic processing using the imaging result. The measurement of the discharge characteristics using the measurement device 300 will be described later in detail with reference to FIG. 3.

The ink amount among the discharge characteristics described above can be measured by not using the measurement device 300, but using a device that picks up an image of the ink that has landed on a recording medium or the like or using an electronic balance that measures the mass of the ink discharged from the liquid discharge head 210. The discharge characteristic may be a characteristic relating to a discharge state of the ink from the liquid discharge head 210, and is a concept including a drive frequency or residual vibration of the liquid discharge head 210 in addition to the above-described characteristics. The residual vibration is vibration remaining in a flow path of the ink in the liquid discharge head 210 after the drive element 211 is driven. The residual vibration is detected in a form of a voltage signal from the drive element 211, for example.

1-1c. Information Processing Apparatus 400

The information processing apparatus 400 is a computer that controls operations of the liquid discharge apparatus 200 and the measurement device 300. Here, the information processing apparatus 400 is communicably connected to each of the liquid discharge apparatus 200 and the measurement device 300 in a wireless or wired manner. A communication network including a LAN or the Internet may intervene in such a connection.

In particular, the information processing apparatus 400 has a function of determining the waveform of the drive pulse PD and performing evaluation for the determination. The configuration of the information processing apparatus 400 will be described later in detail with reference to FIG. 4.

2. Drive Pulse

Figure 2:
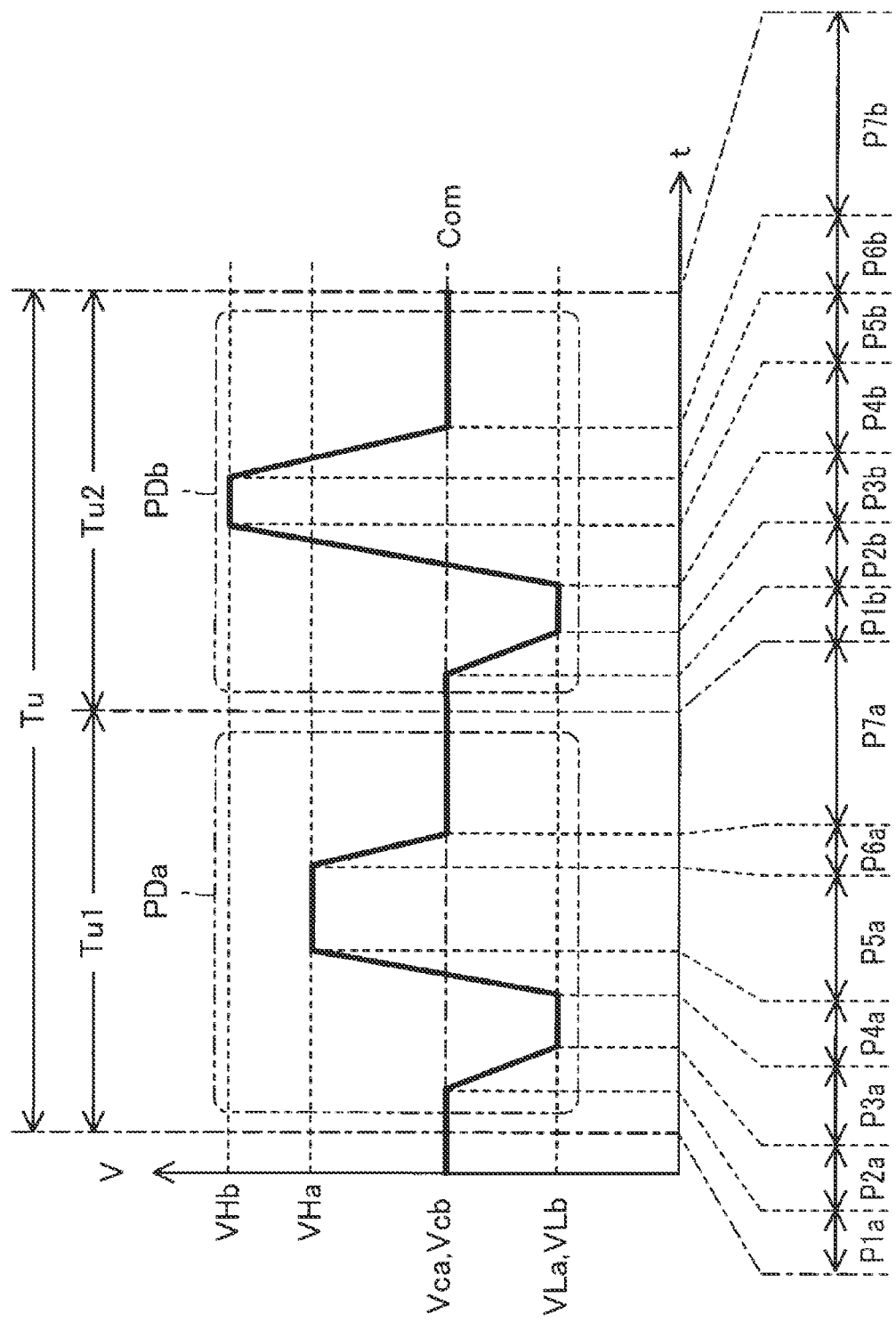
FIG. 2 is a diagram illustrating an example of a waveform of a drive pulse.

FIG. 2 is a diagram illustrating an example of the waveform of the drive pulse PD. In FIG. 2, the horizontal axis indicates the time t, and the vertical axis indicates the potential V. FIG. 2 illustrates changes over time in the potential of the drive signal Com. As illustrated in FIG. 2, the drive signal Com includes a drive pulse PDa and a drive pulse PDb for each unit period Tu of a predetermined cycle. The waveform of a drive pulse PDa is an example of a "first waveform", and the waveform of a drive pulse PDb is an example of a "second waveform".

Each of the drive pulse PDa and the drive pulse PDb is a drive pulse PD for driving the drive element 211 to generate pressure fluctuations in a pressure chamber of the liquid discharge head 210, which are strong enough to discharge an ink from the nozzles of the liquid discharge head 210. Here, a unit period Tu is divided into a period Tu1 including the drive pulse PDa and a period Tu2 including the drive pulse PDb. Each of the drive pulse PDa and the drive pulse PDb may be referred to as the drive pulse PD below.

Figure 5:
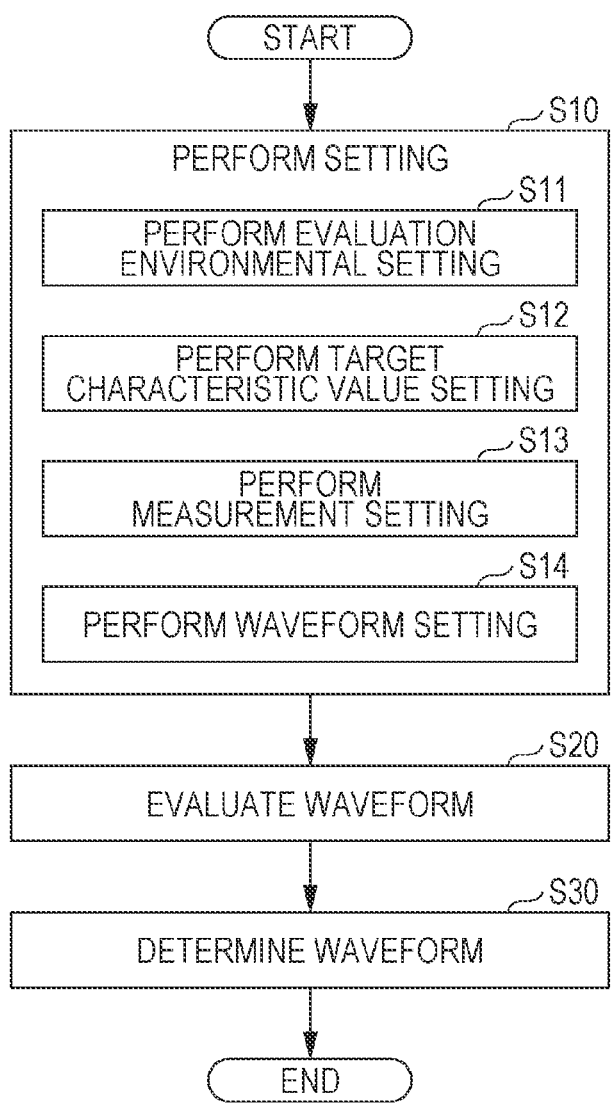
FIG. 5 is a diagram illustrating a flow of determining the waveform of the drive pulse.

In the example illustrated in FIG. 5, the waveform of the drive pulse PDa is a waveform that has passed through a first potential VLa, and a second potential VHa from the intermediate potential Vca in this order, and then returns to the intermediate potential Vca in the period Tu1. The first potential VLa is a potential lower than the intermediate potential Vca. On the other hand, the second potential VHa is a potential higher than the intermediate potential Vca. The intermediate potential Vca is the above-described offset potential VBA or a reference potential obtained by applying a predetermined bias to the offset potential VBA.

Here, the waveform of the drive pulse PDa includes a first period P1a, a second period P2a, a third period P3a, a fourth period P4a, a fifth period P5a, a sixth period P6a, and a seventh period P7a in this order from a start point to an end point. The first period P1a is a period in which the potential is maintained at the intermediate potential VCa. The second period P2a is a period in which the potential is decreased from the intermediate potential VCa to the first potential VLa. The third period P3a is a period in which the potential is maintained at the first potential VLa. The fourth period P4a is a period in which the potential is increased from the first potential VLa to the second potential VHa. The fifth period P5a is a period in which the potential is maintained at the second potential VHa. The sixth period P6a is a period in which the potential is decreased from the second potential VHa to the intermediate potential Vca. The seventh period P7a is a period in which the potential is maintained at the intermediate potential Vca. The start point of the waveform of the drive pulse PDa is the start point of the period Tu1. Also, the end point of the waveform of the drive pulse PDa is the end point of the period Tu1.

The drive pulse PDa described above increases the volume of the pressure chamber of the liquid discharge head 210 by changing from the intermediate potential Vca to the first potential VLa, and sharply decreases the volume of the pressure chamber by changing from the first potential VLa to the second potential VHa. Due to such a change in the volume of the pressure chamber, a portion of the ink in the pressure chamber is discharged as droplets from the nozzle of the liquid discharge head 210.

The waveform of the drive pulse PDb is a waveform that has passed through a first potential VLb and a second potential VHb from an intermediate potential Vcb in this order, and then returns to the intermediate potential Vcb in the period Tu2. The first potential VLb is a potential lower than the intermediate potential Vcb. On the other hand, the second potential VHb is a potential higher than the intermediate potential Vcb. The potential difference between the first potential VLb and the second potential VHb is larger than the potential difference between the first potential VLa and the second potential VHa. In the example illustrated in FIG. 5, the first potential VLb is equal to the first potential VLa, but the second potential VHb is higher than the second potential VHa. The intermediate potential Vcb is equal to the intermediate potential Vca. The potential of each portion of the drive pulse PDb is not limited to the example illustrated in FIG. 5. For example, the first potential VLb may differ from the first potential VLa, and the intermediate potential Vcb may differ from the intermediate potential Vca.

Here, the waveform of the drive pulse PDb includes a first period P1*b*, a second period P2*b*, a third period P3*b*, a fourth period P4*b*, a fifth period P5*b*, a sixth period P6*b*, and a seventh period P7*b* in this order from a start point to an end point. The first period P1*b* is a period in which the potential is maintained at the intermediate potential VCb. The second period P2*b* is a period in which the potential is decreased from the intermediate potential VCb to the first potential VLb. The third period P3*b* is a period in which the potential is maintained at the first potential VLa. The fourth period P4*b* is a period in which the potential is increased from the first potential VLb to the second potential VHb. The fifth period P5*b* is a period in which the potential is maintained at the second potential VHb. The sixth period P6*b* is a period in which the potential is decreased from the second potential VHb to the intermediate potential Vcb. The seventh period P7*b* is a period in which the potential is maintained at the intermediate potential Vcb. The start point of the waveform of the drive pulse PDb is the start point of the period Tu2. Also, the end point of the waveform of the drive pulse PDb is the end point of the period Tu2.

The drive pulse PDb described above increases the volume of the pressure chamber of the liquid discharge head 210 by changing from the intermediate potential Vcb to the first potential VLb, and sharply decreases the volume of the pressure chamber by changing from the first potential VLb to the second potential VHb. Due to such a change in the volume of the pressure chamber, a portion of the ink in the pressure chamber is discharged as droplets from the nozzle of the liquid discharge head 210.

Here, as described above, the potential difference between the first potential VLb and the second potential VHb is larger than the potential difference between the first potential VLa and the second potential VHa. Thus, the amount of liquid discharged from the nozzle in a case using the drive pulse PDb is more than the amount in a case using the drive pulse PDa. Therefore, when the size of a dot formed by the ink discharged from the liquid discharge head 210 in a case using the drive pulse PDa is set as a first size, the size of a dot formed by the ink discharged from the liquid discharge head 210 in a case using the drive pulse PDb is a second size larger than the first size.

In each of the drive pulse PDa and the drive pulse PDb as described above, it is possible to adjust the discharge characteristics of the ink from the liquid discharge head 210 by changing each potential or each period described above.

Each of the intermediate potential Vca and intermediate potential Vcb may be referred to as an intermediate potential Vc below. Each of the first potential VLa and the first potential VLb may be referred to as a first potential VL. Each of the second potential VHa and the second potential VHb may be referred to as a second potential VH. Each of the first period P1*a* and the first period P1*b* may be referred to as a first period P1. Each of the second period P2*a* and the second period P2*b* may be referred to as a second period P2. Each of the third period P3*a* and the third period P3*b* may be referred to as a third period P3. Each of the fourth period P4*a* and the fourth period P4*b* may be referred to as a fourth period P4. Each of the fifth period P5*a* and the fifth period P5*b* may be referred to as a fifth period P5. Each of the sixth period P6*a* and the sixth period P6*b* may be referred to as a sixth period P6. Each of the seventh period P7*a* and the seventh period P7*b* may be referred to as a seventh period P7.

3. Measurement of Discharge Characteristics

Figure 3:
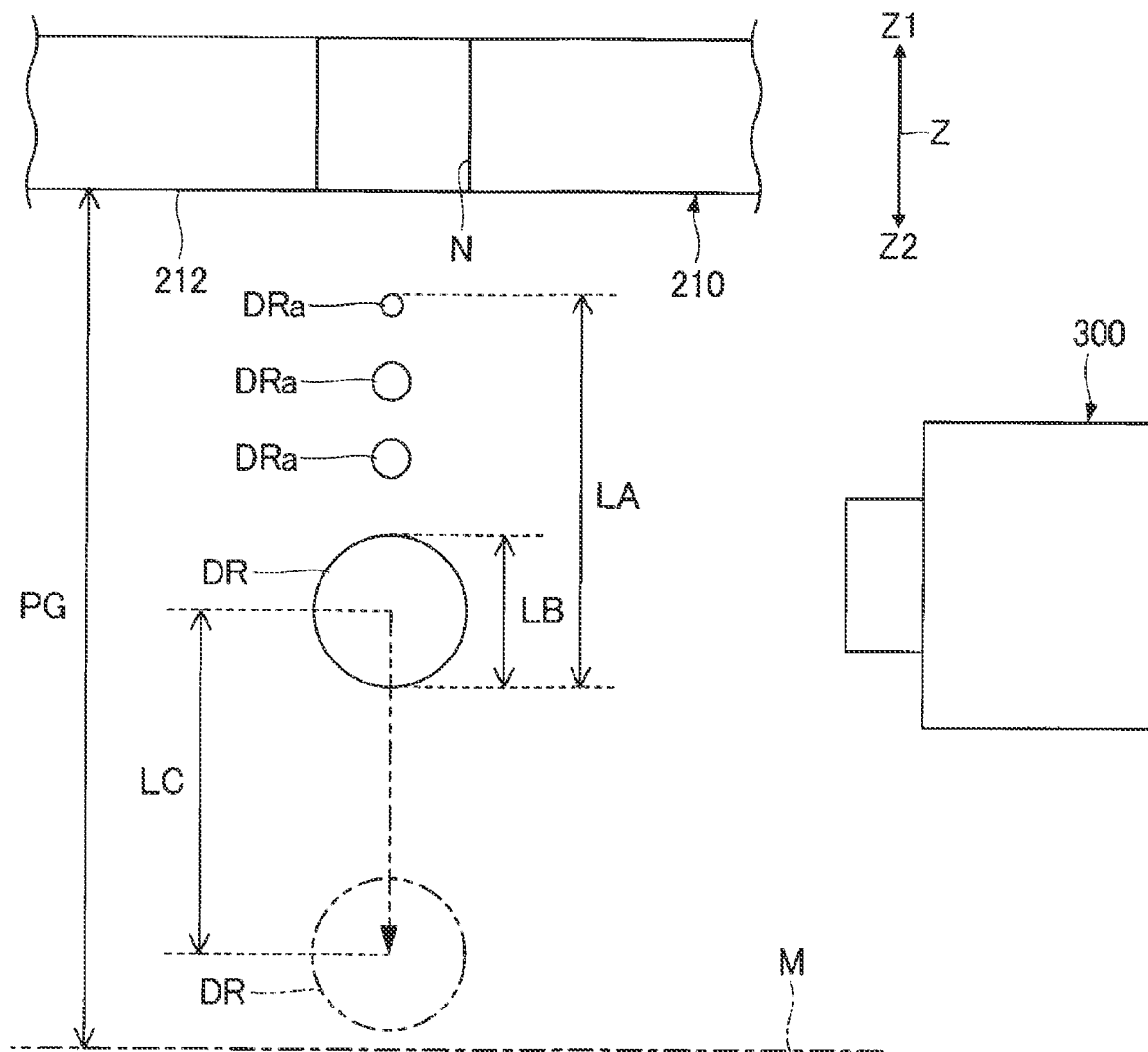
FIG. 3 is a diagram illustrating measurement of discharge characteristics.

FIG. 3 is a diagram illustrating measurement of the discharge characteristics. As illustrated in FIG. 3, the measurement device 300 picks up an image of the scattering state of ink droplets DR discharged from nozzles N of the liquid discharge head 210 from a direction perpendicular to or intersecting with a discharge direction.

In the example illustrated in FIG. 3, the liquid discharge head 210 is provided with a nozzle surface 212 in which the nozzles N are opened. The nozzle surface 212 is normally installed to be parallel to a printing surface of a recording medium M.

The droplet DR is a main droplet discharged from the nozzle N. In the example illustrated in FIG. 3, a plurality of droplets DRa referred to as satellites, which are generated secondarily following the droplets DR, are discharged from the nozzle N in addition to the droplet DR. The droplets DRa have a smaller diameter than the droplet DR. Whether or not the droplets DRa are generated, the number of droplets DRa, the size of the droplets DRa, and the like differ depending on the type of ink, the waveform of the drive pulse PD, and the like.

The measurement device 300 continuously or intermittently picks up images of the scattering droplets DR at minute time intervals. It is possible to measure an arrival timing of the droplet DR on the recording medium M based on the result of the image pickup. In addition, it is possible to measure the position of the droplet DR at each predetermined timing based on the measurement result of the measurement device 300, or to measure the discharge direction, the discharge rate, or the landing position of the droplet DR based on the positions of the droplet DR at a plurality of timings.

The timing at which the scattering distance of the droplet DR from the liquid discharge head 210 reaches a location at a predetermined distance may be calculated based on a time point at which the scattering distance of the droplet DR actually reaches the predetermined distance, or may be calculated based on the discharge rate of the droplet DR and the predetermined distance. Here, when the predetermined distance is a distance PG between the nozzle surface 212 and the recording medium M, the timing at which the droplet DR reaches the recording medium M is measured.

The amount of the droplets DR from the liquid discharge head 210 is calculated as the volume of the droplets DR based on the diameter LB of the droplets DR, by using the pickup image of the measurement device 300, for example. The discharge rate of the droplets DR from the liquid discharge head 210 is calculated, for example, based on a distance LC between any two positions of the scattering droplets DR and the time. In FIG. 3, the droplet DR after the predetermined time is indicated by a two-dot chain line. Also, it is possible to calculate the aspect ratio (LA/LB) of the ink from the liquid discharge head 210 as the discharge characteristic of the ink. It is also possible to obtain the discharge angle of the ink from the liquid discharge head 210 from the positional relationship of the droplets DR before and after the predetermined time. The amount of the droplets DR from the liquid discharge head 210 may be calculated as the mass of the droplets DR based on the diameter LB of the droplet DR and the density of the droplets DR.

4. Information Processing Apparatus

Figure 4:
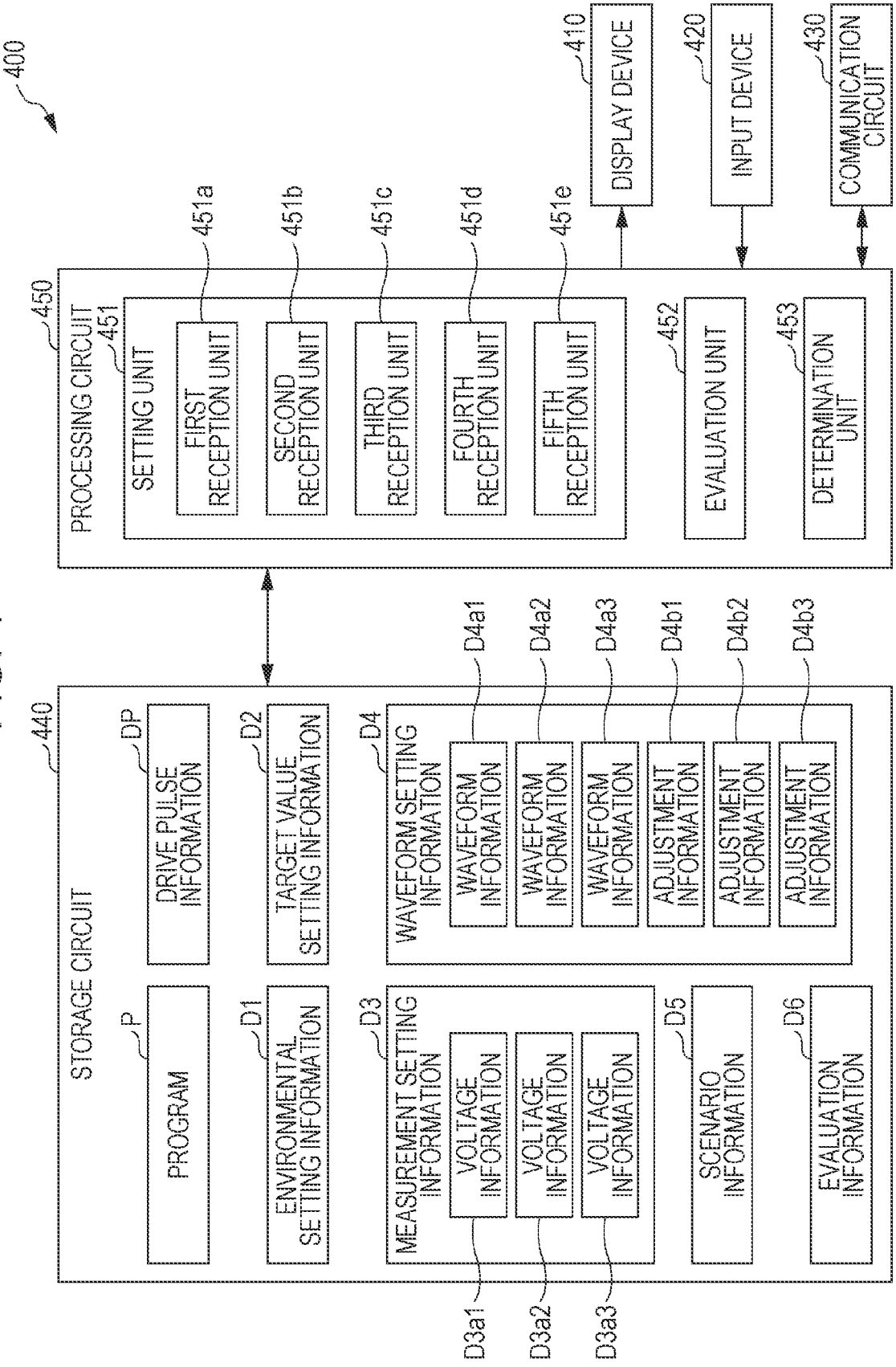
FIG. 4 is a diagram illustrating the information processing apparatus according to the first embodiment.

FIG. 4 is a diagram illustrating the information processing apparatus 400 according to the first embodiment. As illustrated in FIG. 4, the information processing apparatus 400 includes a display device 410, an input device 420, a communication circuit 430, a storage circuit 440, and a processing circuit 450. The display device 410, the input device 420, the communication circuit 430, the storage circuit 440, and the processing circuit 450 are communicably connected to each other.

The display device 410 displays various images under the control of the processing circuit 450. Here, the display device 410 includes various display panels such as a liquid crystal display panel or an organic electro-luminescence (EL) display panel. The display device 410 may be provided outside the information processing apparatus 400. Also, the display device 410 may be a constituent component of the liquid discharge apparatus 200.

The input device 420 is a device that receives an operation from a user. For example, the input device 420 includes a pointing device such as a touch pad, a touch panel, or a mouse. Here, when the input device 420 includes a touch panel, the input device 420 may also serve as the display device 410. The input device 420 may be provided outside the information processing apparatus 400. Also, the input device 420 may be a constituent component of the liquid discharge apparatus 200.

The communication circuit 430 is a communication device that is communicably connected to each of the liquid discharge apparatus 200 and the measurement device 300. The communication circuit 430 includes interfaces such as a USB and a LAN, for example. The communication circuit 430 may be wirelessly connected to the liquid discharge apparatus 200 or the measurement device 300 via Wi-Fi, Bluetooth, or the like, or may be connected to the liquid discharge apparatus 200 or the measurement device 300 via a local area network (LAN), the Internet, or the like.

The storage circuit 440 is a device that stores various programs executed by the processing circuit 450 and various types of data processed by the processing circuit 450. The storage circuit 440 includes, for example, a hard disk drive or a semiconductor memory. A portion or the entirety of the storage circuit 440 may be provided in a storage device, a server, or the like on the outside of the information processing apparatus 400.

The storage circuit 440 in the present embodiment stores a program P, drive pulse information DP, environmental setting information D1, target value setting information D2, measurement setting information D3, waveform setting information D4, scenario information D5, and evaluation information D6. In addition to the above type of information and programs, the storage circuit 440 may appropriately store information regarding other discharge characteristics, waveforms used for measurement by the measurement device 300, information regarding measurement conditions such as a temperature, and the like.

The drive pulse information DP is information regarding the waveform of the drive pulse PD, and is generated by a determination unit 453, which will be described later. For example, the drive pulse information DP is information regarding various parameters for defining the waveform of the drive pulse PD.

The environmental setting information D1 is setting information regarding the environment of the liquid discharge head 210 used for evaluation, and is generated by a setting unit 451, which will be described later. Examples of the environmental setting information D1 include setting information regarding the nozzle resolution of the liquid discharge head 210, setting information regarding whether the number of drive signals Com is plural or single, setting information regarding whether or not to control the temperature of the liquid discharge head 210, setting information regarding a reference value of the temperature under the above control and an error margin for the temperature, setting information regarding the nozzle as an evaluation target among a plurality of nozzles in the liquid discharge head 210, and setting information regarding a storage destination of information regarding the measurement result of the discharge characteristics during evaluation.

The target value setting information D2 is setting information regarding the target condition of the discharge characteristics, and is generated by the setting unit 451, which will be described later. The target condition is an example of a first setting item for determining the waveform of the drive pulse PD. Examples of the target value setting information D2 include setting information regarding the target value of a liquid amount (Iw) per discharge from the liquid discharge head 210, setting information regarding the target value of a drive frequency (also referred to as a discharge frequency below) of the liquid discharge head 210, and setting information regarding the target value of the discharge rate (Vm) of the main droplets discharged from the liquid discharge head 210.

The measurement setting information D3 is setting information regarding measurement conditions of the discharge characteristics, and is generated by the setting unit 451, which will be described later. The measurement condition is an example of a second setting item different from the first setting item for determining the waveform of the drive pulse PD. Examples of the measurement setting information D3 include setting information regarding measurement conditions of the natural vibration period (Tc) of the liquid in the pressure chamber of the liquid discharge head 210, setting information regarding measurement conditions of the ink amount per discharge from the liquid discharge head 210, setting information regarding measurement conditions of the discharge rate of the ink from the liquid discharge head 210, setting information regarding measurement conditions of frequency characteristics of the drive frequency in the liquid discharge head 210, setting information regarding measurement conditions for acquiring a pickup image of the scattering state of the ink discharged from the liquid discharge head 210, and setting information regarding measurement conditions for measuring stability of the ink discharged from the liquid discharge head 210.

Here, the measurement setting information D3 includes types of voltage information $D3a1$, $D3a2$, and $D3a3$. The voltage information $D3a1$ is information for designating a voltage based on an evaluation result of a first discharge characteristic being one of two discharge characteristics different from each other, as a voltage of the drive pulse PD used to evaluate a second discharge characteristic being the other discharge characteristic. The voltage information $D3a2$ is information for designating a voltage freely designated by the user, as the voltage of the drive pulse PD used to evaluate the second discharge characteristics. The voltage information D3*a*3 is information for designating a voltage as the voltage of the drive pulse PD used to evaluate the second discharge characteristics. The voltage designated in the voltage information D3*a*3 is obtained by correcting a voltage obtained from a predetermined evaluation result among voltages based on evaluation results of the first discharge characteristic.

The waveform setting information D4 is information regarding the waveform of the drive pulse PD used for evaluation, and is generated by the setting unit 451, which will be described later. Examples of the waveform setting information D4 include setting information regarding the size of droplets of an ink from the liquid discharge head 210, setting information regarding the waveform as a reference for evaluation, setting information regarding the timing of supplying the drive pulse PD to the liquid discharge head 210, setting information regarding whether or not to combine a plurality of droplets having different sizes, setting information regarding whether or not to adjust the waveform during measurement of the waveform as an evaluation target, setting information regarding a referring destination of the target value for the waveform as an evaluation target, setting information regarding a referring source of a proper voltage used in measurement, and setting information regarding whether or not to perform measurement for the waveform as the evaluation target. The above-described types of information are included in the waveform setting information D4 for each type of measurement.

Here, the waveform setting information D4 includes types of waveform information D4*a*, D4*a*2, D4*a*3 and types of adjustment information D4*b*1, D4*b*2, D4*b*3. The waveform information D4*a*1 is an example of "first information". The waveform information D4*a*2 is an example of "second information". The adjustment information D4*b*2 is an example of "third information". The adjustment information D4*b*1 is an example of "fourth information". The waveform information D4*a*3 is an example of "fifth information".

The waveform information D4*a*1 is information for determining the first waveform as the waveform of the drive pulse PD. The first waveform is, for example, the waveform of the drive pulse PDa. The waveform information D4*a*2 is information for determining the second waveform different from the first waveform as the waveform of the drive pulse PD. The second waveform is, for example, the waveform of the drive pulse PDb. The waveform information D4*a*3 is information for determining the third waveform different from the first waveform and the second waveform, as the waveform of the drive pulse PD. The third waveform is a waveform different from the drive pulse PDa and the drive pulse PDb.

The adjustment information D4*b*1 is information used when determining the waveform (first waveform) of the drive pulse PDa, and is information regarding whether or not to adjust at least a portion of the waveform of the drive pulse PDa to be identical to an element of the waveform of the drive pulse PDb. The adjustment information D4*b*2 is information used when determining the waveform (second waveform) of the drive pulse PDb, and is information regarding whether or not to adjust at least a portion of the waveform of the drive pulse PDb to be identical to an element of the waveform of the drive pulse PDa. The adjustment information D4*b*3 is information used when determining the third waveform, and is information regarding whether or not to adjust at least a portion of the third waveform to be identical to an element of the waveform of the drive pulse PDa or the drive pulse PDb.

Examples of adjustment indicated by the types of adjustment information D4*b*1, D4*b*2, and D4*b*3 include adjustment such that the voltage value at the start point of a waveform as an adjustment target is made to be identical to the voltage value at an end point of another waveform, adjustment such that the intermediate potential Vc of a waveform as an adjustment target is made to be identical to the intermediate potential Vc of another waveform, adjustment such that the maximum potential (second potential VH) of a waveform as an adjustment target is made to be identical to the maximum potential of another waveform, and adjustment such that the time length of a waveform as an adjustment target is made to be identical to the time length of another waveform.

In the present embodiment, each type of the adjustment information D4*b*1, D4*b*2, and D4*b*3 selectively indicates any one of a case where at least a portion of the waveform as the adjustment target is adjusted to be identical to an element of one waveform of two other waveforms, a case where at least a portion of the waveform as the adjustment target is adjusted to be identical to an element of the other waveform among the two other waveforms, and a case where adjustment of at least a portion of the waveform as the adjustment target to be identical to any element of the two other waveforms is not performed, when one waveform among three waveforms is set as the adjustment target.

The scenario information D5 is information regarding one or more combinations of the target value setting information D2 and the measurement setting information D3, and is generated by the setting unit 451, which will be described later. The scenario information D5 may be information including the target value setting information D2 and the measurement setting information D3 themselves, or may be information indicating only the relationship of the combination of the target value setting information D2 and the measurement setting information D3. For example, the scenario information D5 is information in which the target value setting information D2 and the measurement setting information D3 are combined, or information indicating the association between the target value setting information D2 and the measurement setting information D3. The scenario information D5 is preferably information regarding a plurality of combinations of the target value setting information D2 and the measurement setting information D3.

The evaluation information D6 is information regarding the evaluation of discharge characteristics based on the waveform of the drive pulse PD, and is generated by an evaluation unit 452, which will be described later.

The program P provides the processing circuit 450 with various functions for determining or evaluating the waveform of the drive pulse PD.

The processing circuit 450 is a device having a function of controlling each portion of the information processing apparatus 400, the liquid discharge apparatus 200, and the measurement device 300, and a function of processing various types of data. The processing circuit 450 includes, for example, a processor such as a central processing unit (CPU). The processing circuit 450 may be configured with a single processor, or may be configured with a plurality of processors. Some or all of the functions of the processing circuit 450 may be realized by hardware such as a digital signal processor (DSP), an application specific integrated circuit (ASIC), a programmable logic device (PLD), and a field programmable gate array (FPGA).

The processing circuit 450 functions as the setting unit 451, the evaluation unit 452, and a determination unit 453 by reading the program P from the storage circuit 440 and executing the program P.

The setting unit 451 performs various settings required for evaluation for determining the waveform of the drive pulse PD. Specifically, the setting unit 451 causes the display device 410 to display an image for a graphical user interface (GUI) for setting. The setting unit 451 receives an input of the environmental setting information D1, the target value setting Information D2, the measurement setting information D3, the waveform setting information D4, and the scenario information D5 and generates the above types of information, in accordance with an operation of the input device 420 based on the displayed image.

Here, the setting unit 451 includes a first reception unit 451a that receives an input of the waveform information D4a1, a second reception unit 451b that receives an input of the waveform information D4a2, a third reception unit 451c that receives an input of the adjustment information D4b2, a fourth reception unit 451d that receives an input of the adjustment information D4b1, and a fifth reception unit 451e that receives an input of the waveform information D4a3. When the adjustment information D4b2 received by the third reception unit 451c indicates that at least a portion of the waveform of the drive pulse PDb is adjusted to be identical to the element of the waveform of the drive pulse PDa, the fourth reception unit 451d does not permit reception of the input of the adjustment information D4b2.

In the present embodiment, the first reception unit 451a causes the display device 410 to display a waveform setting section G5 (more specifically, an input portion G5-1 and an input portion G5-2 on any one tab T19 among a plurality of tabs T19) to be described later, as a GUI image for inputting the waveform information D4a1. The second reception unit 451b causes the display device 410 to display a waveform setting section G5 (more specifically, an input portion G5-1 and an input portion G5-2 on a tab T19 different from the tab T19 used to input the waveform information D4a1) to be described later, as a GUI image for inputting the waveform information D4a2. The third reception unit 451c causes the display device 410 to display a waveform setting section G5 (more specifically, an input portion G5-3 on the tab T19 used to input the waveform information D4a2) to be described later, as a GUI image for inputting the adjustment information D4b2. The fourth reception unit 451d causes the display device 410 to display a waveform setting section G5 (more specifically, an input portion G5-3 on the tab T19 used to input the waveform information D4a1) to be described later, as a GUI image for inputting the adjustment information D4b1. The fifth reception unit 451e causes the display device 410 to display a waveform setting section G5 (more specifically, an input portion G5-1 and an input portion G5-2 on a tab T19 different from the tabs T19 used to input the waveform information D4a1 and the waveform information D4a2) to be described later, as a GUI image for inputting the waveform information D4a3.

The evaluation unit 452 evaluates the waveform of the drive pulse PD based on the setting result of the setting unit 451. Specifically, the evaluation unit 452 generates the evaluation information D6 based on the environmental setting information D1, the target value setting information D2, the measurement setting information D3, and the waveform setting information D4. Here, for example, the evaluation unit 452 uses the drive pulse PD having a waveform based on the waveform setting information D4 to measure the discharge characteristics with the measurement device 300 under conditions based on the environmental setting information D1 and the measurement setting information D3. Then, the evaluation unit 452 generates the evaluation information D6 based on the difference between the measurement result and the target value indicated by the target value setting information D2.

The determination unit 453 determines the waveform of the drive pulse PD based on the evaluation information D6 indicating the evaluation result of the evaluation unit 452. Specifically, the determination unit 453 determines, for example, a waveform corresponding to the evaluation result closest to the target value among the evaluation results indicated by the evaluation information D6, as the waveform of the drive pulse PD, and generates drive pulse information DP indicating the determined waveform.

5. Determination of Waveform of Drive Pulse

FIG. 5 is a diagram illustrating the flow of determining the waveform of the drive pulse PD.

The waveform of the drive pulse PD is determined by executing Step S10 for setting, Step S20 for evaluation, and Step S30 for determination in this order, as illustrated in FIG. 5.

In Step S10, the setting unit 451 performs various settings necessary for evaluation of discharge characteristics based on the waveform of the drive pulse PD. In the example illustrated in FIG. 5, Step S10 includes Step S11 for evaluation environmental setting, Step S12 for target characteristic value setting, Step S13 for measurement setting, Step S14 for waveform setting. The execution order of Steps S11, S12, S13, and S14 is freely set.

In Step S20, the evaluation unit 452 performs measurement based on the measurement conditions set in Step S10, and performs evaluation based on whether or not the measurement result satisfies the target condition set in Step S10. In Step S30, the determination unit 453 determines the waveform of the drive pulse PD based on the evaluation result in Step S20.

6. Settings for Evaluation of Discharge Characteristics Based on Waveform of Drive Pulse In Step S10 described above, information regarding various settings necessary for evaluation of the discharge characteristics based on the waveform of the drive pulse PD is input to the information processing apparatus 400 by using a GUI of the display device 410 and the input device 420 in the information processing apparatus 400. Here, an image of the above GUI is displayed on the display device 410. This image will be described below.

6-1. Main Window

Figure 6:
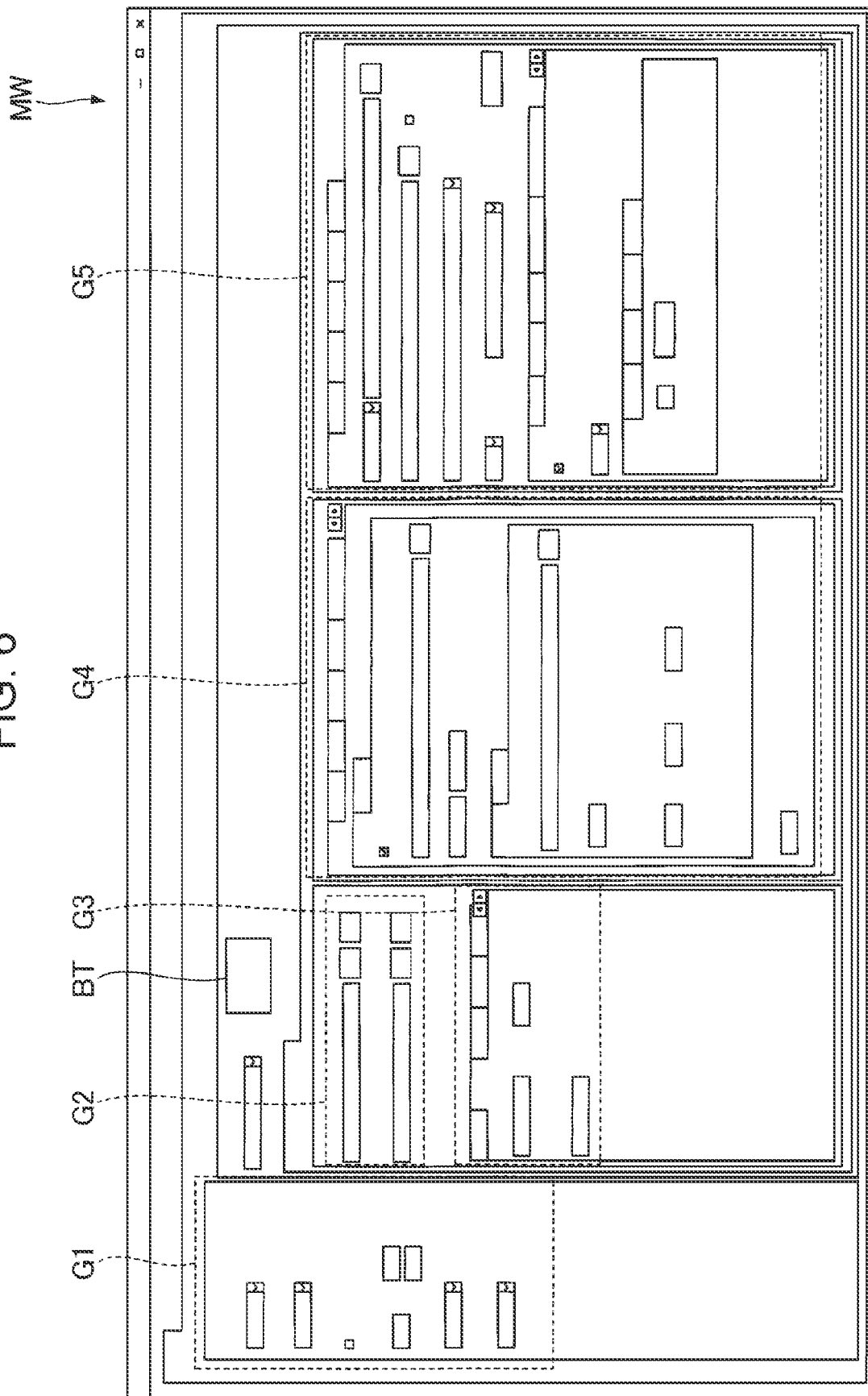
FIG. 6 is a diagram illustrating a main window displayed on a display device when setting for evaluation of the discharge characteristics based on the waveform of the drive pulse is performed.

FIG. 6 is a diagram illustrating a main window MW displayed on the display device 410 when setting for evaluation of the discharge characteristics based on the waveform of the drive pulse PD is performed. In Step S10 described above, the main window MW is displayed on the display device 410, as illustrated in FIG. 6. An image for inputting items necessary for setting for evaluation of discharge characteristics based on the waveform of the drive pulse PD is displayed on the main window MW. Specifically, an evaluation environmental setting section G1, an evaluation scenario input and output section G2, a target characteristic value setting section G3, a measurement setting section G4, a waveform setting section G5, and an evaluation setting button BT are displayed in the main window MW. FIG. 6 illustrates the main window MW in a simplified manner for convenience of drawing.

The evaluation environmental setting section G1 is a region for setting the environment of the liquid discharge head 210 used for evaluation. Information input by using the evaluation environmental setting section G1 is stored in the storage circuit 440 of the information processing apparatus 400 as the environmental setting information D1. The evaluation environmental setting section G1 will be described later in detail with reference to FIG. 7.

The evaluation scenario input and output section G2 is a region for storing information regarding the condition input by using the target characteristic value setting section G3, the measurement setting section G4, and the waveform setting section G5, in the storage circuit 440 as the scenario information D5 and for reading the scenario information D5 from the storage circuit 440 and applying information indicated by the scenario information D5 to the target characteristic value setting section G3, the measurement setting section G4, and the waveform setting section G5. The evaluation scenario input and output section G2 will be described later in detail with reference to FIG. 8.

The target characteristic value setting section G3 is a region for setting target conditions for discharge characteristics. Information input by using the target characteristic value setting section G3 is stored in the storage circuit 440 as the target value setting information D2. The target characteristic value setting section G3 will be described later in detail with reference to FIG. 8.

The measurement setting section G4 is a region for setting the measurement conditions of the discharge characteristics. Information input by using the measurement setting section G4 is stored in the storage circuit 440 as the measurement setting information D3. The measurement setting section G4 will be described later in detail with reference to FIGS. 9 to 21.

The waveform setting section G5 is a region for setting the waveform of the drive pulse PD used for evaluation. Information input by using the waveform setting section G5 is stored in the storage circuit 440 as the waveform setting information D4. The waveform setting section G5 will be described later in detail with reference to FIGS. 22 to 26.

The evaluation setting button BT is a button for setting, as the measurement conditions and the target conditions in Step S20 described above, conditions input by using the evaluation scenario input and output section G2, the target characteristic value setting section G3, the measurement setting section G4, and the waveform setting section G5.

6-2. Evaluation Environmental Setting

FIG. 7 is a diagram illustrating the evaluation environmental setting section G1, which is the region for setting the evaluation environment. As illustrated in FIG. 7, the evaluation environmental setting section G1 includes an input portion G1-1, an input portion G1-2, an input portion G1-3, an input portion G1-4, an input portion G1-5, and an input portion G1-6.

The input portion G1-1 is a region for inputting the nozzle resolution of the liquid discharge head 210. The input portion G1-2 is a region for selecting and inputting whether the number of drive signals Com is plural or singular. The input portion G1-3 is a region for inputting a selection as to whether or not to control the temperature of the liquid discharge head 210, and a reference value and an error margin for the temperature when the control is performed. The input portion G1-4 is a region for selecting and inputting a detection nozzle, which is a nozzle as an evaluation target among the plurality of nozzles of the liquid discharge head 210. The input portion G1-5 is a region for inputting a storage destination of information regarding the measurement results of the discharge characteristics during evaluation.

6-3. Target Characteristic Value Setting

Figure 8:
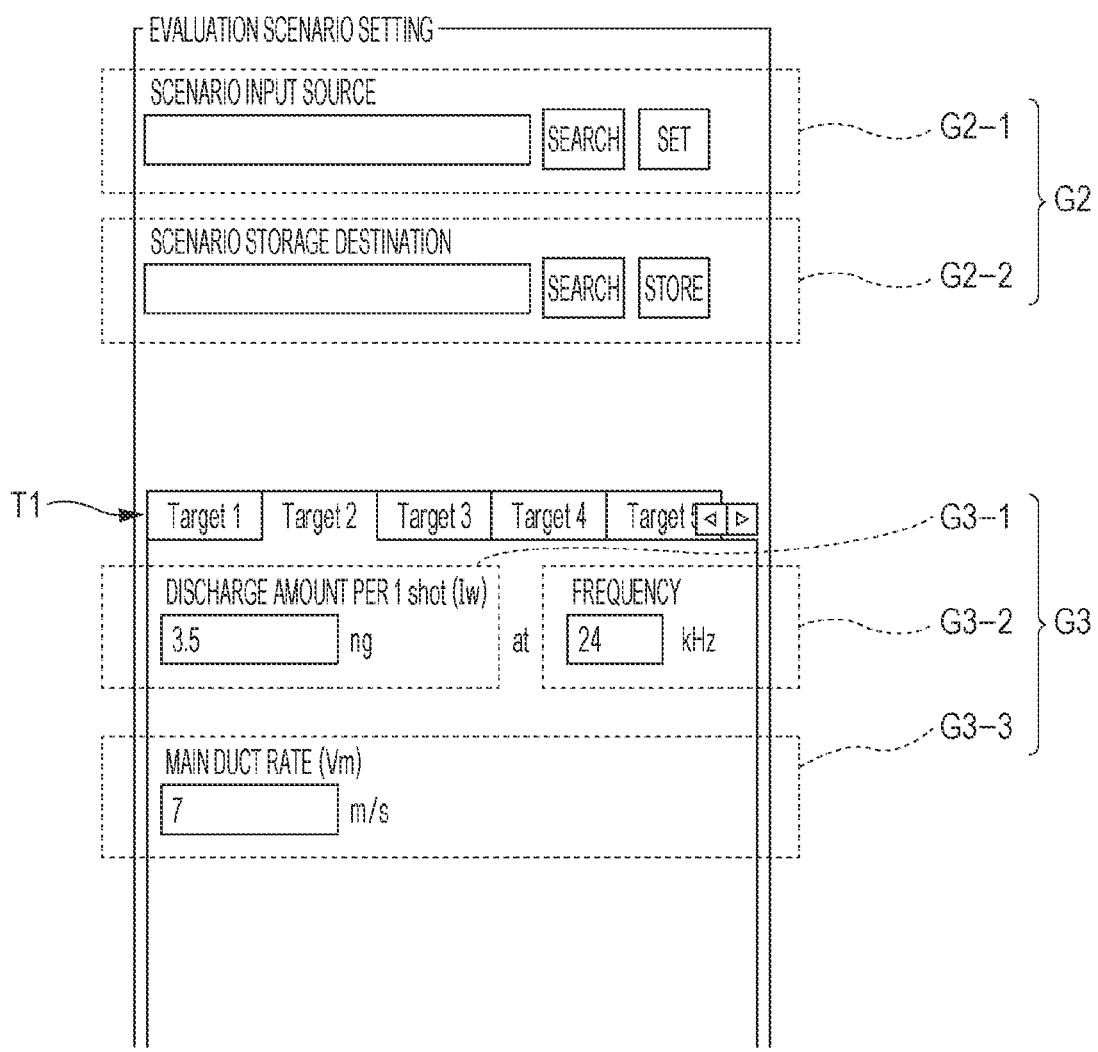
FIG. 8 is a diagram illustrating a display for setting a target characteristic value.

FIG. 8 is a diagram illustrating the evaluation scenario input and output section G2 and the target characteristic value setting section G3, which are the regions for setting target characteristic values. As illustrated in FIG. 8, the evaluation scenario input and output section G2 includes an input portion G2-1 and an input portion G2-2.

The input portion G2-1 is a region for reading the scenario information D5 from the storage circuit 440 and applying the information indicated by the scenario information D5 to the target characteristic value setting section G3, the measurement setting section G4, and the waveform setting section G5. In the example illustrated in FIG. 8, the input portion G2-1 includes a field for enabling a display or an input of a referring destination path of the scenario information D5, a button for displaying a dialog for referring to the scenario information D5, and a button for applying the information indicated by the selected scenario information D5 to each setting section.

As will be described later, when the user performs an input to each of input portions G4-1 to G4-43 and G5-1 to 5-19, and individually sets desired information (condition) in each setting item (including a first setting item and a second setting item) through the reception unit (including the first reception unit 451*a* and the second reception unit 451*b*), it is possible to determine the waveform under conditions desired by the user. However, since many setting items are to be set, some users may feel the setting complicated, which may reduce usability. On the other hand, in the present embodiment, the scenario information D5 in which information is set in each setting item is stored in the storage circuit 440 in advance, and thus the user can perform an input to the input portion G2-1 by selecting the scenario information D5 from the storage circuit 440. In this manner, it is possible to collectively set information in each setting item. This makes it possible to reduce the complexity of setting and improve the usability.

The input portion G2-2 is a region for storing, in the storage circuit 440, the information regarding the conditions input by using the target characteristic value setting section G3, the measurement setting section G4, and the waveform setting section G5 as the scenario information D5. In the example illustrated in FIG. 8, the input portion G2-2 includes a field for enabling a display or an input of a storage destination path of the scenario information D5, a button for displaying a dialog for storing the scenario information D5, and a button for storing the scenario information D5 in the storage destination.

When the above-described scenario information D5 is used, predetermined information is collectively set in each setting item. Thus, it is assumed that, for example, some pieces of the information may differ from the conditions desired by the user. In this case, it is sufficient that, after information is collectively set in each setting item by using the scenario information D5, an input is performed only to the input portion corresponding to the setting item intended to be changed by the user among the input portions G4-1 to G4-43 and G5-1 to G5-19 to be described later, so as to update the information in the item desired by the user. However, for users who intend to continuously and repeatedly determine waveforms under the same conditions, it is assumed that a method of performing the above processing each time the waveform is determined is felt complicated. On the other hand, in the present embodiment, when the user changes some pieces of information from the scenario information D5 set in advance, the combination of the pieces of information can be stored as new scenario information D5. Even when the user performs an input to each of the input portions G4-1 to G4-43 and G5-1 to 5-19 to individually set information in each setting item without using the scenario information D5 from the beginning, it is possible to store the combination of pieces of the set information as new scenario information D5.

The target characteristic value setting section G3 includes an input portion G3-1, an input portion G3-2, and an input portion G3-3. Here, the target characteristic value setting section G3 is provided with a plurality of selectable tabs T1, and an input using the input portion G3-1, the input portion G3-2, and the input portion G3-3 is possible for each tab T1.

The input portion G3-1 is a region for inputting the target value for the liquid amount (Iw) per discharge from the liquid discharge head 210. The input portion G3-2 is a region for inputting the target value of the drive frequency of the drive element 211. The input portion G3-3 is a region for inputting the target value for the discharge rate (Vm) of the main droplets discharged from the liquid discharge head 210.

6-4. Measurement Settings

Figure 9:
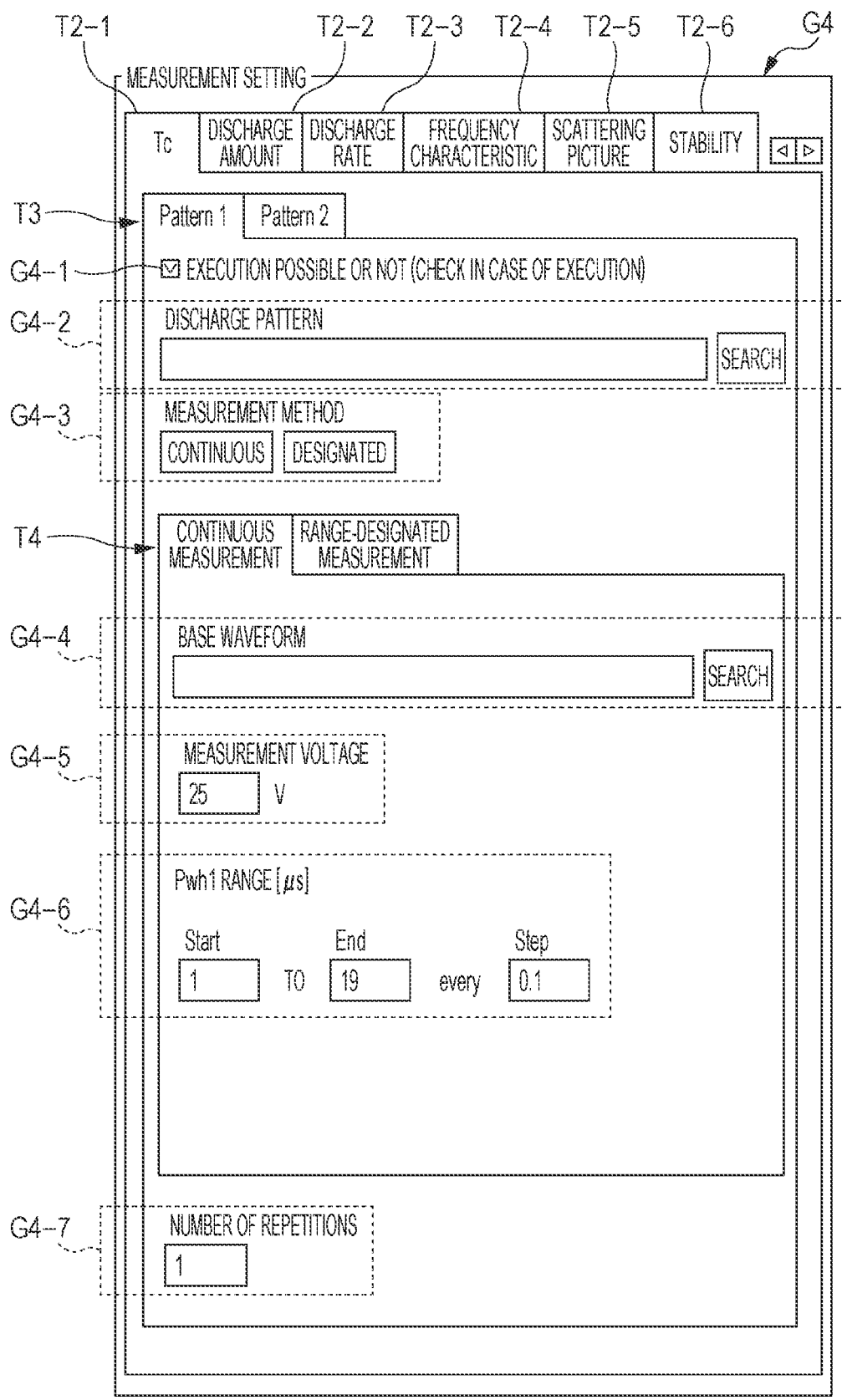
FIG. 9 is a diagram illustrating a display for measurement setting.

FIGS. 9 to 21 are diagrams illustrating the measurement setting section G4, which is a region for setting the measurement. As illustrated in FIG. 9, the measurement setting section G4 is provided with a plurality of selectable tabs T2-1 to T2-6, and information can be input for each of the tabs.

In the example illustrated in FIG. 9, the tab T2-1 is selected when the measurement conditions for the natural vibration period (Tc) of the liquid in the pressure chamber of the liquid discharge head 210 are input. The tab T2-2 is selected when the measurement conditions for the ink amount per discharge from the liquid discharge head 210 are input. The tab T2-3 is selected when the measurement conditions for the discharge rate of the ink from the liquid discharge head 210 are input. The tab T2-4 is selected when the measurement conditions for the frequency characteristics of the drive frequency of the liquid discharge head 210 are input. The tab T2-5 is selected when the measurement conditions for acquiring a pickup image of the scattering state of the ink discharged from the liquid discharge head 210 are input. The tab T2-6 is selected when the measurement conditions for measuring the stability of the ink discharged from the liquid discharge head 210 are input.

Display when the tabs T2-1 to T2-5 are selected will be sequentially described below. The description of the case where the tab T2-6 is selected will be omitted. 6-4-1. Setting of Measurement Conditions for Natural Vibration Period (Tc)

As illustrated in FIG. 9, when the tab T2-1 is selected, the input portions G4-1 to G4-7 are displayed in the measurement setting section G4. Here, the measurement setting section G4 is provided with a plurality of selectable tabs T3, and an input using the input portions G4-1 to G4-7 is possible for each tab T3.

The input portion G4-1 is a region for inputting whether or not to measure the natural vibration period (Tc) of the liquid in the pressure chamber of the liquid discharge head 210.

The input portion G4-2 is a region for designating a file for setting a discharge pattern of the ink from the liquid discharge head 210 and inputting the information of the file.

The input portion G4-3 is a region for selecting whether to continuously perform measurement within the measurement range of a period Pwh1 corresponding to the third period P3, or to perform measurement in a portion of the measurement range of the period Pwh1. By the selection, the display by the tab T4 is switched. The case where the measurement is performed continuously within the measurement range of the period Pwh1 will be described below as a representative example.

The input portion G4-4 is a region for designating a file for setting the reference waveform of the drive pulse used to measure the natural vibration period (Tc) and for inputting information on the file.

The input portion G4-5 is a region for inputting the voltage value of the drive pulse used to measure the natural vibration period (Tc).

The input portion G4-6 is a region for designating the range of the period Pwh1. In the example illustrated in FIG. 9, fields for designating the interval when the period Pwh1 is changed within the range are displayed in the input portion G4-6 in addition to the start and end points of the range.

The input portion G4-7 is a region for designating the number of times of repeating measurement of the natural vibration period (Tc) under the same conditions.

6-4-2. Setting of Measurement Conditions for Ink Amount Iw

As illustrated in FIG. 10, when the tab T2-2 is selected, the input portions G4-8 to G4-15 are displayed in the measurement setting section G4. Here, the measurement setting section G4 is provided with a plurality of selectable tabs T5, and an input using the input portions G4-8 to G4-15 is possible for each tab T5.

The input portion G4-8 is a region for designating the number of nozzles used to measure the ink amount Iw per discharge from the liquid discharge head 210.

The input portion G4-9 is a region for designating a file for setting a discharge pattern of the ink from the liquid discharge head 210 and inputting the information of the file.

The input portion G4-10 is a region for designating the number of times of discharging the ink from the liquid discharge head 210.

The input portion G4-11 is a region for designating the discharge frequency of the ink from the liquid discharge head 210. In the example illustrated in FIG. 10, a button for setting the discharge frequency to a target value, a button for setting the discharge frequency to the half value of the target value, and a button for setting the discharge frequency to a designated value are displayed in the input portion G4-11.

The input portion G4-12 is a region for inputting the designated value of the discharge frequency.

The input portion G4-13 is a region for designating the range of the voltage Vh corresponding to the potential difference between the first potential VL and the second potential VH. In the example illustrated in FIG. 10, fields for designating the interval when the voltage Vh is changed within the range are displayed in the input portion G4-13 in addition to the start and end points of the range.

The input portion G4-14 is a region for designating a calculation method for each evaluation voltage of the ink amount Iw used to calculate the proper voltage. In the example illustrated in FIG. 10, a button for designating using of the average value of the measured values, a button for designating using of the maximum value of the measured values, and a button for designating using of the minimum value of the measured values are displayed in the input portion G4-14.

The input portion G4-15 is a region for designating the number of times of repeating the measurement of the ink amount Iw under the same conditions.

6-4-3. Setting of Measurement Conditions for Discharge Rate Vw

Figure 11:
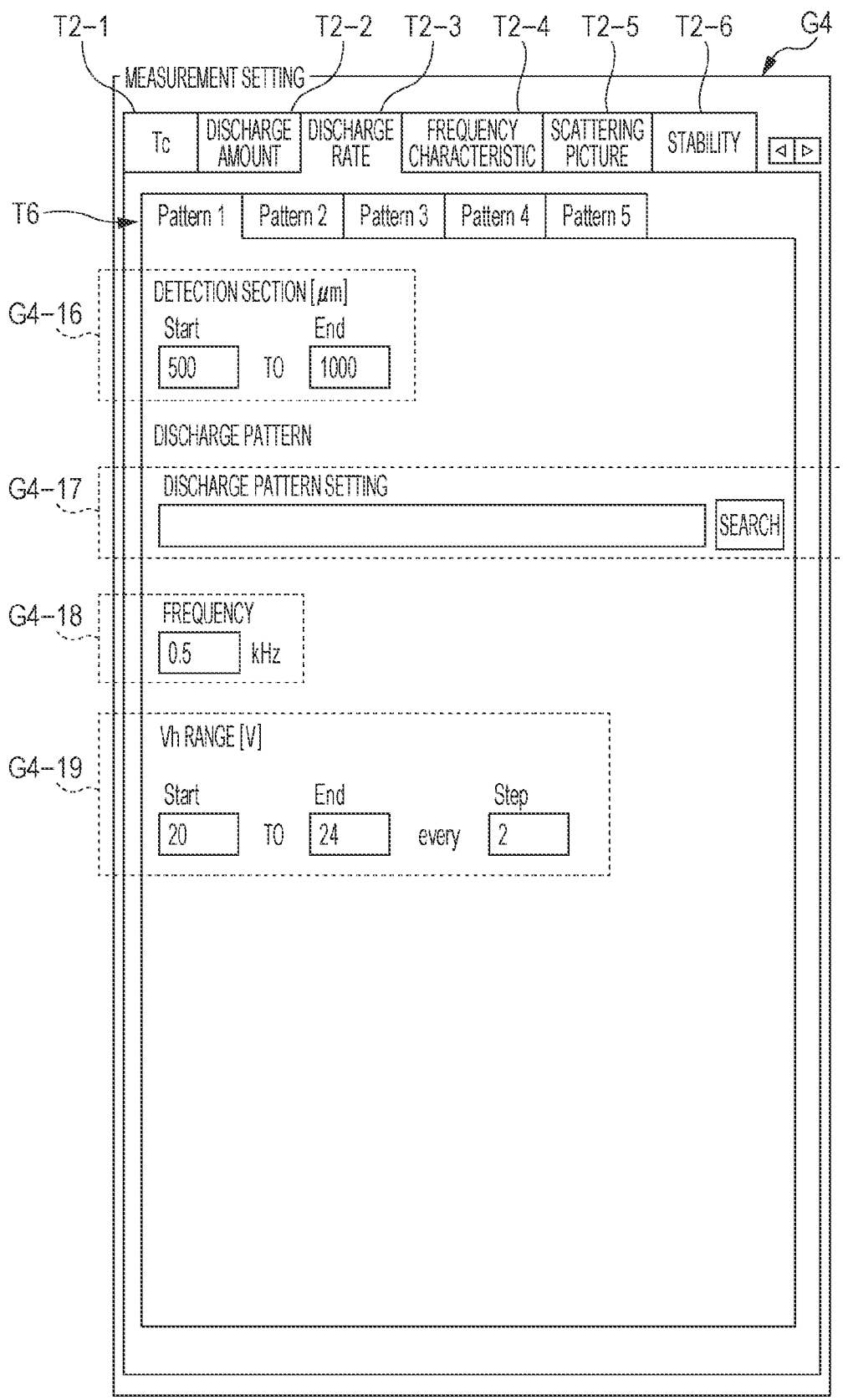
FIG. 11 is a diagram illustrating a display for the measurement setting.

As illustrated in FIG. 11, when the tab T2-3 is selected, the input portions G4-16 to G4-19 are displayed in the measurement setting section G4. Here, the measurement setting section G4 is provided with a plurality of selectable tabs T6, and an input using the input portions G4-16 to G4-19 is possible for each tab T6.

The input portion G4-16 is a region for designating a section for detecting droplets when the discharge rate Vm is measured.

The input portion G4-17 is a region for designating a file for setting a discharge pattern of the ink from the liquid discharge head 210 and inputting the information of the file.

The input portion G4-18 is a region for designating the drive frequency of the liquid discharge head 210.

The input portion G4-19 is a region for designating the range of the voltage Vh. In the example illustrated in FIG. 11, fields for designating the interval when the voltage Vh is changed within the range are displayed in the input portion G4-19 in addition to the start and end points of the range.

Figure 12:
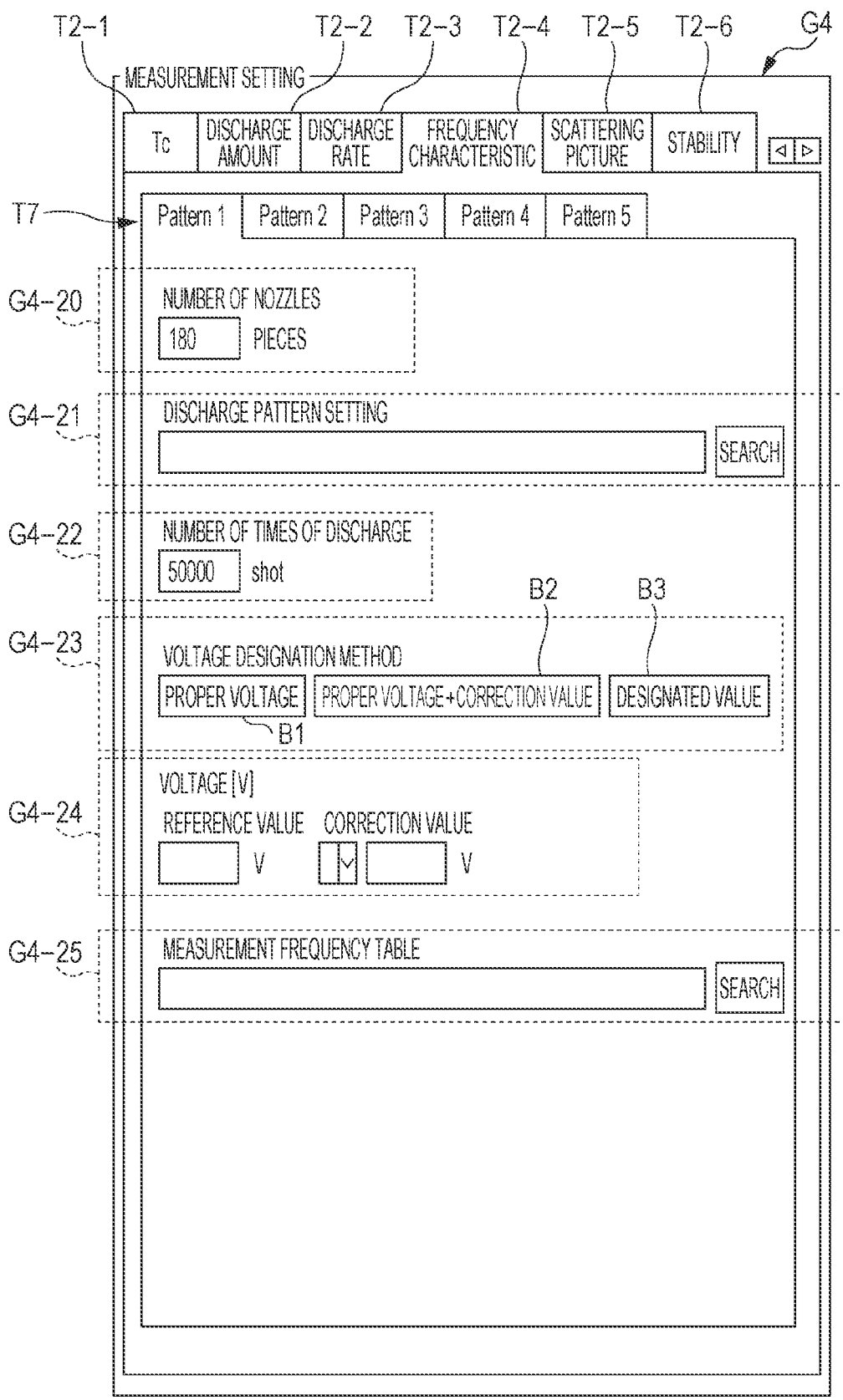
FIG. 12 is a diagram illustrating a display for the measurement setting.

6-4-4. Setting of Measurement Conditions for Frequency Characteristics of Drive Frequency in Head As illustrated in FIG. 12, when the tab T2-4 is selected, the input portions G4-20 to G4-25 are displayed in the measurement setting section G4. Here, the measurement setting section G4 is provided with a plurality of selectable tabs T7, and an input using the input portions G4-20 to G4-25 is possible for each tab T7.

The input portion G4-20 is a region for designating the number of nozzles used to measure the frequency characteristics of the drive frequency in the liquid discharge head 210.

The input portion G4-21 is a region for designating a file for setting a discharge pattern of the ink from the liquid discharge head 210 and inputting the information of the file.

The input portion G4-22 is a region for designating the number of times of discharging the ink from the liquid discharge head 210.

The input portion G4-23 is a region for designating the voltage Vh. In the example illustrated in FIG. 12, a button B1 for inputting, as the proper voltage, the optimal voltage Vh obtained as a result of measuring the ink amount Iw described above, a button B2 for inputting, as the voltage Vh, a voltage obtained by adding a correction value to the proper voltage, and a button B3 for designating a designated value as the voltage Vh are displayed in the input portion G4-23. That is, in the evaluation of the discharge frequency, the user can select a case using the voltage Vh determined to be proper in the evaluation of the ink amount Iw, a case using a voltage obtained by correcting the voltage Vh determined to be proper by a correction value input in the input portion G4-24, or a case using a voltage freely designated by the user. The reception unit receives the selection result.

The input portion G4-24 is a region for inputting the designated value and the correction value for the voltage Vh used in the input portion G4-23.

The input portion G4-25 is a region for designating a file for setting the discharge frequency and inputting information on the file.

6-4-5. Setting of Measurement Conditions for Scattering State of Ink

Figure 13:
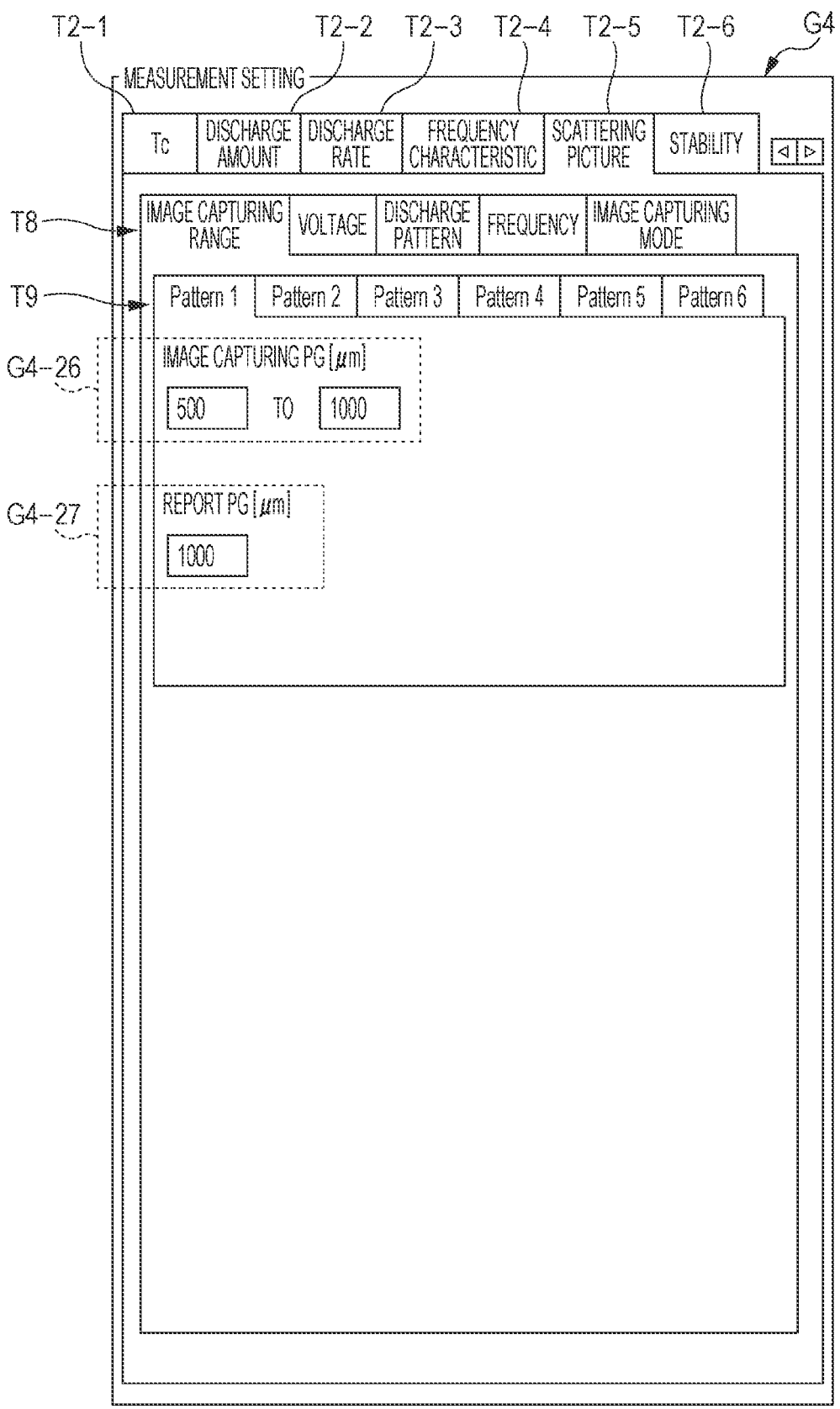
FIG. 13 is a diagram illustrating a display for the measurement setting.

As illustrated in FIG. 13, when the tab T2-5 is selected, the measurement setting section G4 is provided with a plurality of selectable tabs T8. With the selection of the tab T8, each of items of an image capturing range, a voltage, a discharge pattern, a frequency, and an image capturing mode can be set. The case where each item is selected will be described below in order.

When the item of the image capturing range is selected on the tab T8, an input portion G4-26 and an input portion G4-27 are displayed in the measurement setting section G4. Here, the measurement setting section G4 is provided with a plurality of selectable tabs T9, and an input using the input portion G4-26 and the input portion G4-27 is possible for each tab T9.

The input portion G4-26 is a region for designating the range of the distance PG included in the image capturing range.

The input portion G4-27 is a region for inputting the value of the distance PG for outputting the image capturing result.

Figure 14:
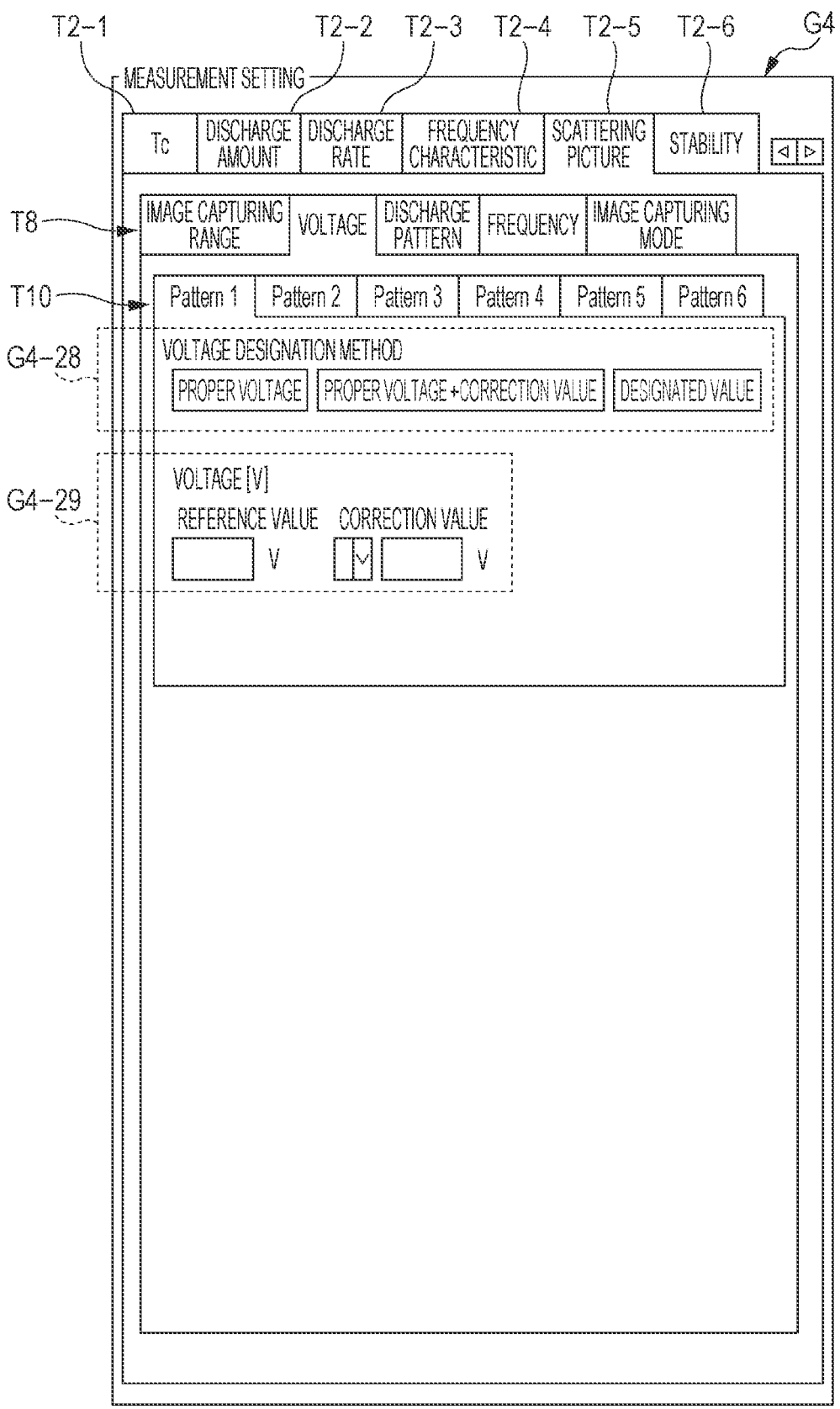
FIG. 14 is a diagram illustrating a display for the measurement setting.

As illustrated in FIG. 14, when the item of the voltage is selected on the tab T8, an input portion G4-28 and an input portion G4-29 are displayed in the measurement setting section G4. Here, the measurement setting section G4 is provided with a plurality of selectable tabs T10, and an input using the input portion G4-28 and an input portion G4-29 is possible for each tab T10.

The input portion G4-28 is a region for designating the voltage Vh. In the example illustrated in FIG. 14, a button for inputting the optimum voltage Vh as the proper voltage when the ink amount Iw is measured as described above, a button for inputting, as the voltage Vh, the voltage obtained by adding a correction value to the proper voltage, and a button for designating the designated value as the voltage Vh are displayed in the input portion G4-28.

The input portion G4-29 is a region for inputting the designated value and the correction value for the voltage Vh used in the input portion G4-28.

Figure 15:
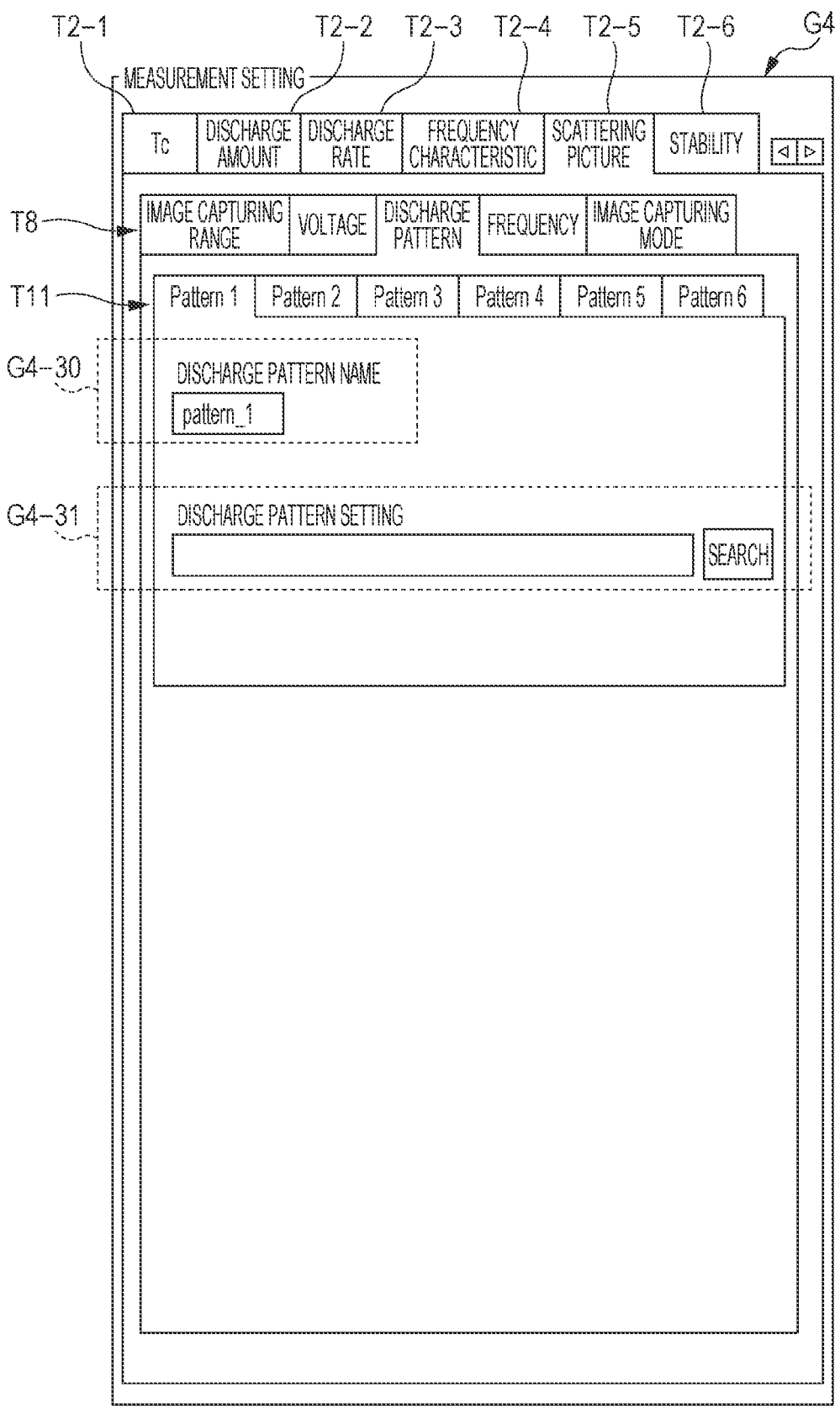
FIG. 15 is a diagram illustrating a display for the measurement setting.

As illustrated in FIG. 15, when the item of the discharge pattern is selected on the tab T8, an input portion G4-30 and an input portion G4-31 are displayed in the measurement setting section G4. Here, the measurement setting section G4 is provided with a plurality of selectable tabs T11, and an input using the input portion G4-30 and an input portion G4-31 is possible for each tab T11.

The input portion G4-30 is a region for inputting a certain discharge pattern name.

The input portion G4-31 is a region for designating a file for setting a discharge pattern of the ink from the liquid discharge head 210 and inputting the information of the file.

Figure 16:
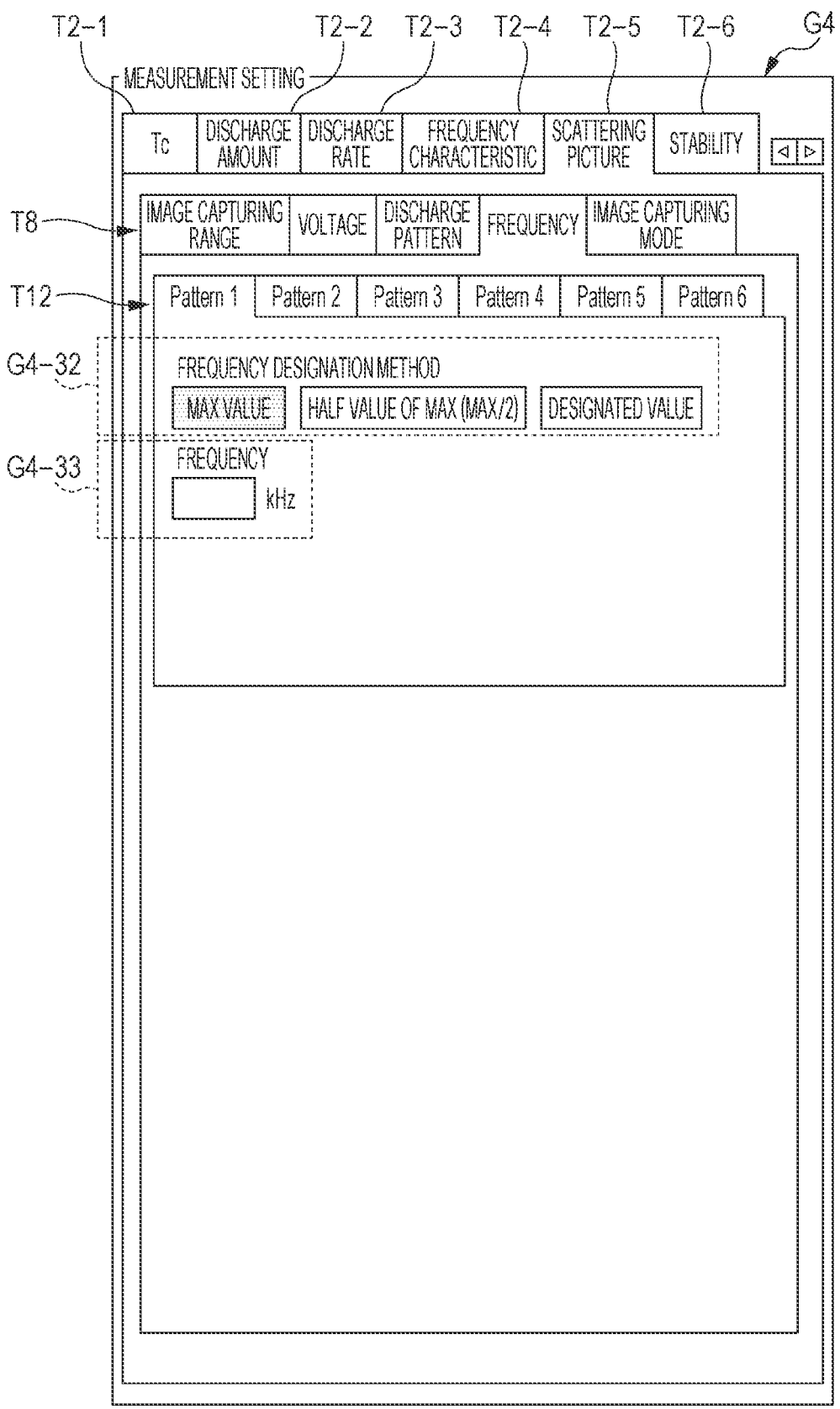
FIG. 16 is a diagram illustrating a display for the measurement setting.

As illustrated in FIG. 16, when the item of the frequency is selected on the tab T8, an input portion G4-32 and an input portion G4-33 are displayed in the measurement setting section G4. Here, the measurement setting section G4 is provided with a plurality of selectable tabs T12, and an input using the input portion G4-32 and an input portion G4-33 is possible for each tab T12.

The input portion G4-32 is a region for designating the discharge frequency of the ink from the liquid discharge head 210. In the example illustrated in FIG. 16, a button for setting the discharge frequency to a target value, a button for setting the discharge frequency to the half value of the target value, and a button for setting the discharge frequency to a designated value are displayed in the input portion G4-32.

The input portion G4-33 is a region for inputting the designated value of the discharge frequency.

Figure 17:
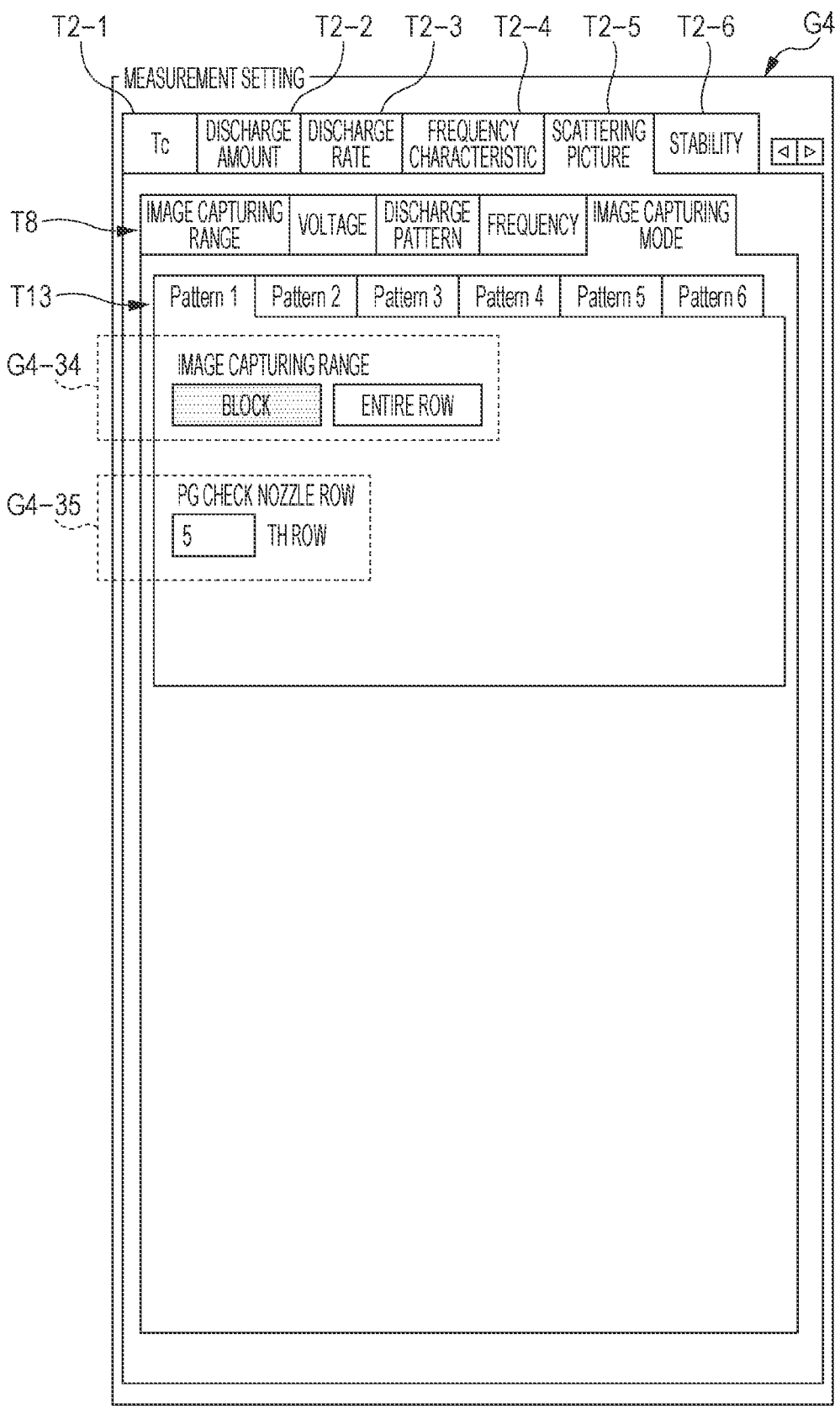
FIG. 17 is a diagram illustrating a display for the measurement setting.

As illustrated in FIG. 17, when the item of the image capturing mode is selected on the tab T8, an input portion G4-34 and an input portion G4-35 are displayed in the measurement setting section G4. Here, the measurement setting section G4 is provided with a plurality of selectable tabs T13, and an input using the input portion G4-34 and an input portion G4-35 is possible for each tab T13.

The input portion G4-34 is a region for selecting the entire nozzle row or a partial block as the image capturing range.

The input portion G4-35 is a region for designating a nozzle row for checking the distance PG.

6-4-6. Setting of Measurement Conditions for Discharge Stability of Ink

Figure 18:
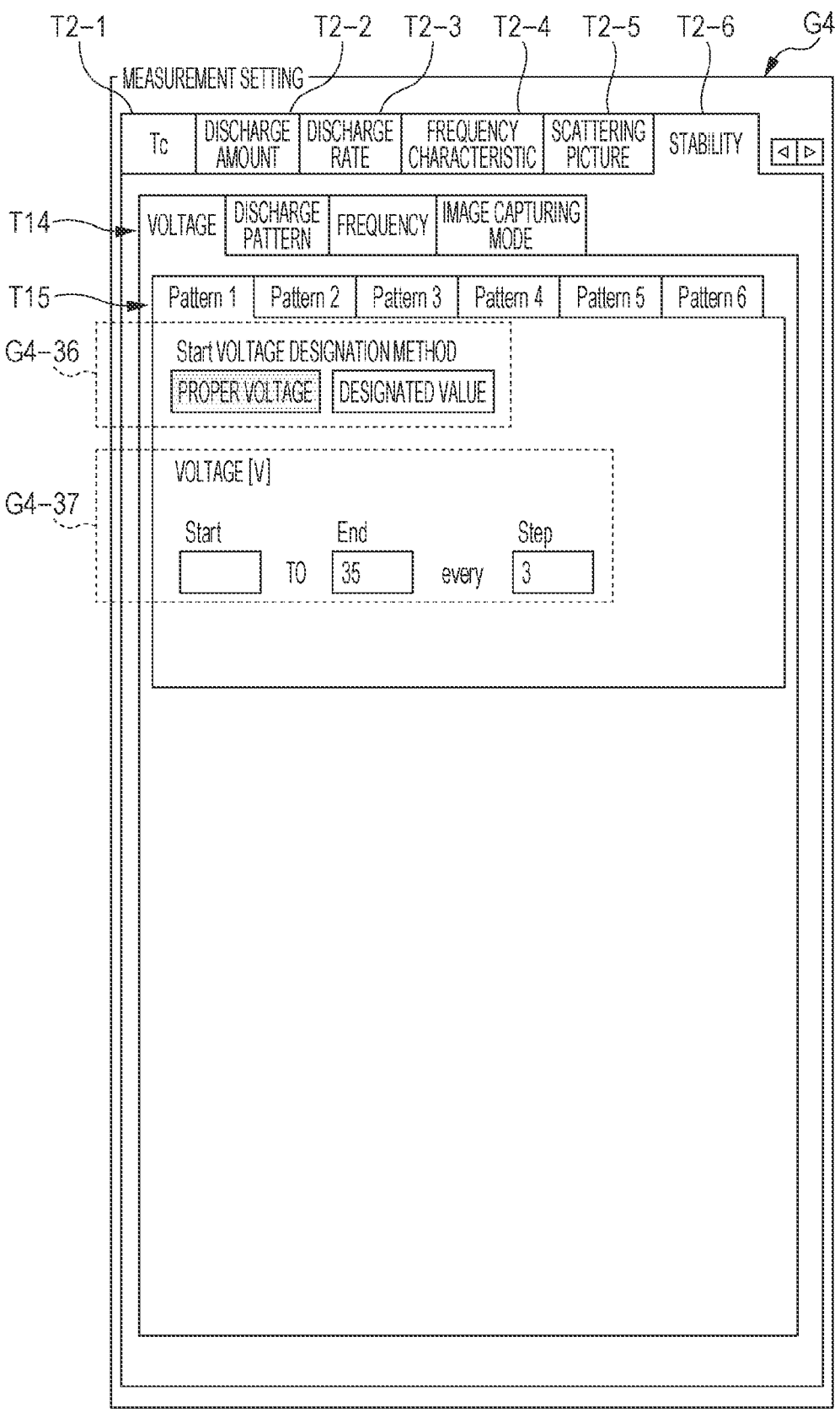
FIG. 18 is a diagram illustrating a display for the measurement setting.

As illustrated in FIG. 18, when the tab T2-6 is selected, the measurement setting section G4 is provided with a plurality of selectable tabs T14. With the selection of the tab T14, each of items of a voltage, a discharge pattern, a frequency, and an image capturing mode can be set.

When the item of the voltage is selected on the tab T14, an input portion G4-36 and an input portion G4-37 are displayed in the measurement setting section G4. Here, the measurement setting section G4 is provided with a plurality of selectable tabs T15, and an input using the input portion G4-36 and an input portion G4-37 is possible for each tab T15.

The input portion G4-37 is a region for designating the voltage Vh. In the example illustrated in FIG. 18, a button for inputting the optimum voltage Vh as the proper voltage when the ink amount Iw described above is measured, and a button for designating the designated value as the voltage Vh are displayed in the input portion G4-37.

The input portion G4-38 is a region for inputting a range of the designated value of the voltage Vh used in the input portion G4-37. In the example illustrated in FIG. 18, fields for designating the interval when the voltage Vh is changed within the range are displayed in the input portion G4-38 in addition to the start and end points of the range.

Figure 19:
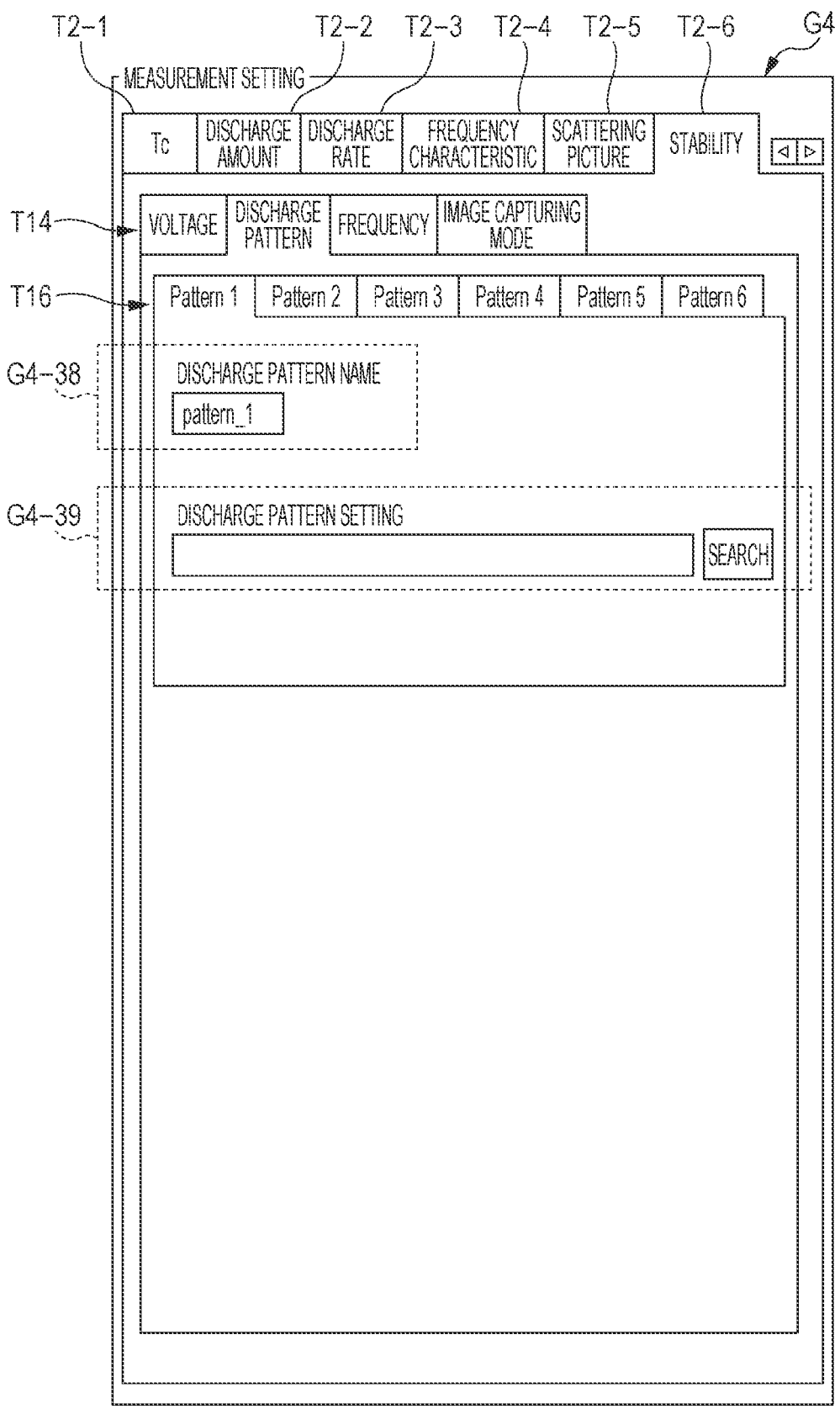
FIG. 19 is a diagram illustrating a display for the measurement setting.

As illustrated in FIG. 19, when the item of the discharge pattern is selected on the tab T14, an input portion G4-38 and an input portion G4-39 are displayed in the measurement setting section G4. Here, the measurement setting section G4 is provided with a plurality of selectable tabs T16, and an input using the input portion G4-38 and an input portion G4-39 is possible for each tab T16.

The input portion G4-38 is a region for inputting a certain discharge pattern name.

The input portion G4-39 is a region for designating a file for setting a discharge pattern of the ink from the liquid discharge head 210 and inputting the information of the file.

Figure 20:
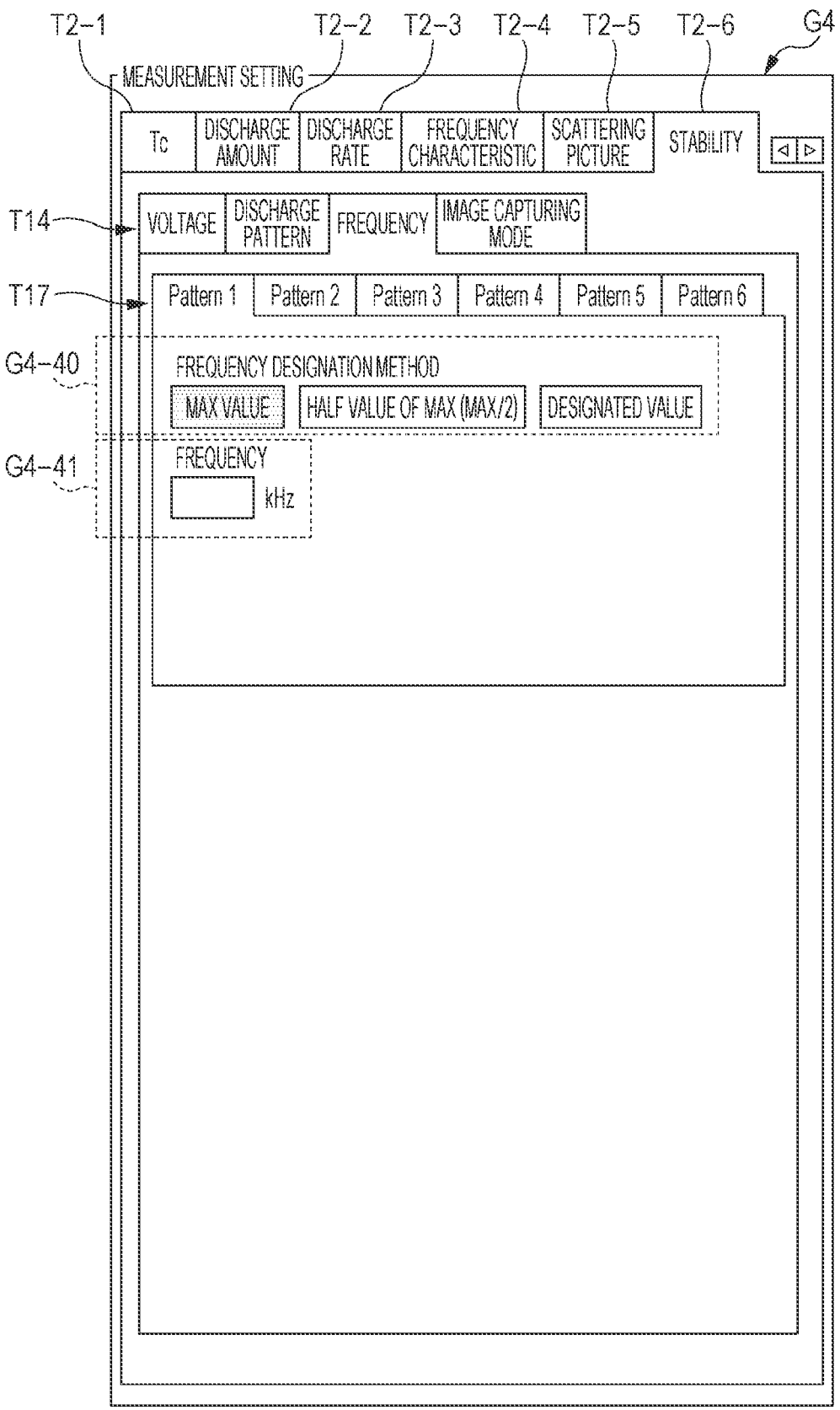
FIG. 20 is a diagram illustrating a display for the measurement setting.

As illustrated in FIG. 20, when the item of the frequency is selected on the tab T14, an input portion G4-40 and an input portion G4-41 are displayed in the measurement setting section G4. Here, the measurement setting section G4 is provided with a plurality of selectable tabs T17, and an input using the input portion G4-40 and an input portion G4-41 is possible for each tab T17.

The input portion G4-40 is a region for designating the discharge frequency of the liquid discharge head 210. In the example illustrated in FIG. 20, a button for setting the discharge frequency to a target value, a button for setting the discharge frequency to the half value of the target value, and a button for setting the discharge frequency to a designated value are displayed in the input portion G4-40.

The input portion G4-41 is a region for inputting the designated value of the discharge frequency.

Figure 21:
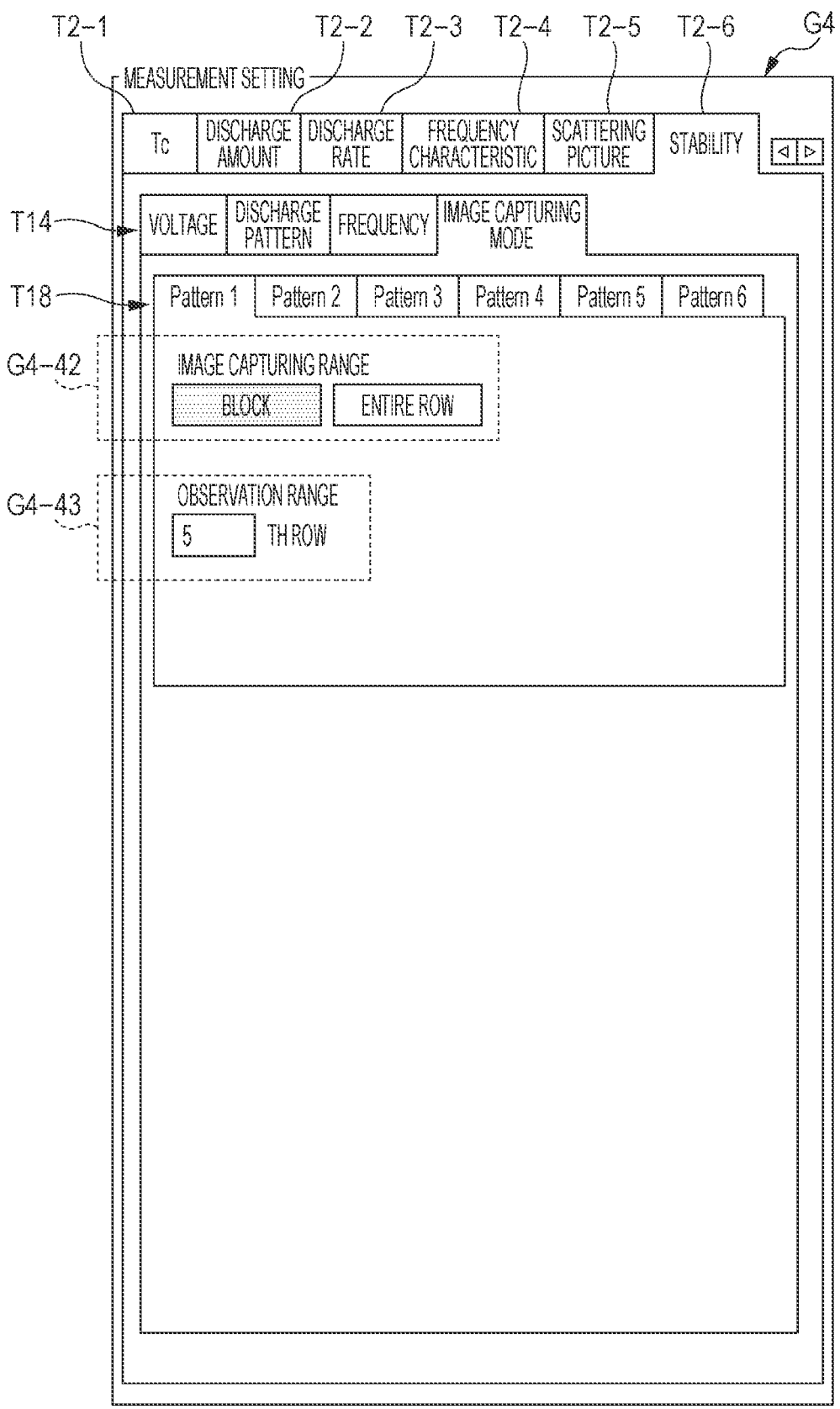
FIG. 21 is a diagram illustrating a display for the measurement setting.

As illustrated in FIG. 21, when the item of the image capturing mode is selected on the tab T14, an input portion G4-42 and an input portion G4-43 are displayed in the measurement setting section G4. Here, the measurement setting section G4 is provided with a plurality of selectable tabs T18, and an input using the input portion G4-42 and an input portion G4-43 is possible for each tab T18.

The input portion G4-42 is a region for selecting the entire nozzle row or a partial block as the image capturing range.

The input portion G4-43 is a region for designating a nozzle row for checking the distance PG.

6-5. Waveform Setting

FIGS. 22 to 26 are diagrams illustrating the waveform setting section G5, which is a region for waveform setting. As illustrated in FIG. 22, input portions G5-1 to G5-4 are displayed in the waveform setting section G5. Here, the waveform setting section G5 is provided with a plurality of selectable tabs T19, and an input using input portions G5-1 to G5-4 is possible for each tab T19. The input portion G5-1 and the input portion G5-2 are examples of a first input portion, a second input portion, or a fifth input portion. The tabs T19 used for the first input portion, the second input portion, and the fifth input portion are different from each other. The input portion G5-3 on the tab T19 used for the second input portion is an example of a third input portion. The input portion G5-3 on the tab T19 used for the first input portion is an example of a fourth input portion.

The waveform setting section G5 is provided with a plurality of selectable tabs T20. With the selection of the tabs T20, each of items of a discharge amount, a discharge rate, a frequency characteristic, a scattering picture, and stability can be set. Here, the item of the discharge amount on the tab T20 corresponds to the item on the tab T2-2 described above. The item of the discharge rate on the tab T20 corresponds to the item on the tab T2-3 described above. The item of the frequency characteristic on the tab T20 corresponds to the item on the tab T2-4 described above. The item of the scattering picture on the tab T20 corresponds to the item on the tab T2-5 described above. The item of the stability on the tab T20 corresponds to the item on the tab T2-6 described above. Each item on the tab T20 can be set for each tab T19. A case where each item on the tab T20 is selected will be described below in order.

As illustrated in FIG. 22, when the item of the discharge amount is selected on the tab T20, input portions G5-1 to G5-7 are displayed in the waveform setting section G5.

The input portion G5-1 is a region for designating the size of droplets of the ink from the liquid discharge head 210, designating a file for setting a reference waveform for evaluation, or inputting information on the designated file. In the example illustrated in FIG. 22, one size is selected from a plurality of sizes such as "Large", "Middle", and "Small", as the size of a droplet.

The input portion G5-2 is a region for designating a file for setting a timing of supplying the drive pulse PD to the liquid discharge head 210 and a region for inputting information on the file. In the example illustrated in FIG. 22, in addition to the input of the information on the file, an item (LMS mixed) for inputting whether or not to combine a plurality of droplets having different sizes is displayed in the input portion G5-2.

The input portion G5-3 is a region for setting whether or not waveform adjustment during measurement of the waveform as an evaluation target. Although not illustrated, for example, an option that does not adjust the waveform and an option that adjust the intermediate potential Vc to the same value as the intermediate potential Vc at the time of the proper voltage for each other droplet size are displayed in the input portion G5-3.

Specifically, four options of "none", "adjust the intermediate potential Vc to the same value as Large", "adjust the intermediate potential Vc to the same value as Middle", and "adjust the intermediate potential Vc to the same value as Small" are displayed in the input portion G5-3, and the user selects and inputs one of the above options. The reception unit receives the input result. As a result, when the drive waveform for the size of a portion being input (in the example illustrated in FIGS. 22 to 26, the drive waveform for Large as indicated by G5-1) is determined, it is possible to adjust whether or not the intermediate potential Vc matches with the drive waveform for another size. For example, in the examples illustrated in FIGS. 22 to 26, when "adjust the intermediate potential Vc to the same value as Small" is selected, the drive waveform for Large can be searched for in a state of satisfying a restriction that the drive waveform for Small and the intermediate potential Vc are made to have the same value. As illustrated in FIG. 2, the drive waveforms for different sizes are coupled to each other at the intermediate potential Vc. Therefore, when the drive waveform for Large and the drive waveform for Small are separately searched for and determined, there is a concern that the intermediate potential Vc is different, and thus the intermediate potential difference may cause an adverse effect at a portion where the drive waveform is switched. However, according to the present embodiment, it is possible to determine the drive waveform for each size in a state of avoiding such an adverse effect.

The input portion G5-4 is a region for inputting the referring destination of the target value for the waveform as an evaluation target and the referring source of the proper voltage used during measurement. Specifically, the item on the tab T1 in the target characteristic value setting section G3 as described above is set as the referring destination of the target value for the waveform as the evaluation target is set in the input portion G5-4. Also, although not illustrated, as the referring source for the proper voltage used during measurement, an option of using the proper voltage calculated by the self-waveform evaluation, and an option of using the proper voltage calculated by another waveform evaluation for each droplet size are displayed in the input portion G5-4. In addition, a button for performing setting not to permit an input using the input portion G5-4 is displayed in the input portion G5-4.

The input portion G5-5 is a region for inputting whether or not to measure the waveform as the evaluation target.

The input portion G5-6 is a region for inputting the number of measurement cases for the waveform as the evaluation target.

The input portion G5-7 is a region for selecting items on the tab T5 in the measurement setting section G4. In the example illustrated in FIG. 22, in addition to the display for selecting the items on the tab T5, buttons for checking the contents of the items on the tab T5 are displayed in the input portion G5-7. Here, the item on the tab T5 is selected by using the plurality of tabs T20 selectable for each of the cases corresponding to the number of cases input in the input portion G5-6.

As illustrated in FIG. 23, when the item of the discharge rate is selected on the tab T20, input portions G5-8 to G5-10 are displayed in the waveform setting section G5.

The input portion G5-8 is a region for inputting whether or not to measure the waveform as the evaluation target.

The input portion G5-9 is a region for inputting the number of measurement cases for the waveform as the evaluation target.

The input portion G5-10 is a region for selecting items on the tab T5 in the measurement setting section G4. In the example illustrated in FIG. 23, in addition to the display for selecting the items on the tab T5, a button for checking the content of the item on the tab T5, and a field for inputting the number of repetitions of measurement are displayed in the input portion G5-10. Here, the item on the tab T5 is selected by using a plurality of tabs T22 selectable for each of the cases corresponding to the number of cases input in the input portion G5-9.

As illustrated in FIG. 24, when the item of the frequency characteristic is selected on the tab T20, input portions G5-11 to G5-13 are displayed in the waveform setting section G5.

The input portion G5-11 is a region for inputting whether or not to measure the waveform as the evaluation target.

The input portion G5-12 is a region for inputting the number of measurement cases for the waveform as the evaluation target.

The input portion G5-13 is a region for selecting items on the tab T5 in the measurement setting section G4. In the example illustrated in FIG. 24, in addition to the display for selecting the items on the tab T5, a button for checking the content of the item on the tab T5, and a field for inputting the number of repetitions of measurement are displayed in the input portion G5-13. Here, the item on the tab T5 is selected by using a plurality of tabs T23 selectable for each of the cases corresponding to the number of cases input in the input portion G5-12.

As illustrated in FIG. 25, when the item of the scattering picture is selected on the tab T20, input portions G5-14 to G5-16 are displayed in the waveform setting section G5.

The input portion G5-14 is a region for inputting whether or not to measure the waveform as the evaluation target.

The input portion G5-15 is a region for inputting the number of measurement cases for the waveform as the evaluation target.

The input portion G5-16 is a region for selecting items on the tabs T9 to T13 in the measurement setting section G4 for the image capturing range, the voltage, the discharge pattern, the frequency, and the image capturing mode, respectively. In the example illustrated in FIG. 25, in addition to the display for selecting the items on tabs T9 to T13, a field for inputting the number of times of repeating measurement is displayed in the input portion G5-16. Here, the items on the tabs T9 to T13 are selected by using a plurality of tabs T24 selectable for each of the cases corresponding to the number of cases input in the input portion G5-15.

As illustrated in FIG. 26, when the item of the stability is selected on the tab T20, input portions G5-17 to G5-19 are displayed in the waveform setting section G5.

The input portion G5-17 is a region for inputting whether or not to measure the waveform as the evaluation target.

The input portion G5-18 is a region for inputting the number of measurement cases for the waveform as the evaluation target.

The input portion G5-19 is a region for selecting items on the tabs T10 to T13 in the measurement setting section G4 for the voltage, the discharge pattern, the frequency, and the image capturing mode, respectively. In the example illustrated in FIG. 25, in addition to the display for selecting the items on tabs T10 to T13, a field for inputting the number of times of repeating measurement is displayed in the input portion G5-16. Here, the items on the tabs T10 to T13 are selected by using a plurality of tabs T25 selectable for each of the cases corresponding to the number of cases input in the input portion G5-19.

As described above, the information processing apparatus 400 is used to determine the waveform of the drive pulse PD applied to the drive element 211 provided in the liquid discharge head 210 that discharges an ink, which is an example of "liquid". Here, the information processing apparatus 400 includes the first reception unit 451a, the second reception unit 451b, and the third reception unit 451c as described above.

The first reception unit 451a receives an input of waveform information D4a1, which is an example of "first information". The waveform information D4a1 is information for determining the waveform (first waveform) of the drive pulse PDa as the waveform of the drive pulse PD. The second reception unit 451b receives an input of waveform information D4a2, which is an example of "second information". The waveform information D4a2 is information for determining the waveform of the drive pulse PDb (second waveform different from the first waveform) as the waveform of the drive pulse PD. The third reception unit 451c receives an input of adjustment information D4b2, which is an example of "third information". The adjustment information D4b2 is information used when determining the waveform of the drive pulse PDb, and is information regarding whether or not to adjust at least a portion of the waveform of the drive pulse PDb to be identical to an element of the waveform of the drive pulse PDa.

In the information processing apparatus 400 described above, the first reception unit 451a receives the input of the waveform information D4a1. Thus, it is possible to determine the waveform of the drive pulse PDa based on the waveform information D4a1 as the waveform of the drive pulse PD, and to perform the evaluation for the determination. Further, since the second reception unit 451b receives the input of the waveform information D4a2, it is possible to determine the waveform of the drive pulse PDb based on the waveform information D4a2 as the waveform of the drive pulse PD, and to perform the evaluation for the determination. In addition, since the third reception unit 4541c receives the input of the adjustment information D4b2, when the waveform of the drive pulse PDb is determined or the evaluation for the determination is performed, if necessary, it is possible to adjust at least a portion of the waveform of the drive pulse PDb to be identical to the element of the waveform of the drive pulse PDa. Therefore, it is possible to reduce the labor of the user when the waveform of the drive pulse PDb is determined or the evaluation for the determination is performed. In addition, since the waveform of the drive pulse PD is adjusted by using the waveform of the drive pulse PD that has a record of causing no adverse effects on discharge and the like, it is possible to reduce the occurrence of troubles such as adverse effects on discharge when the waveform of the drive pulse PD is determined or the evaluation for the determination is performed.

Further, as described above, the adjustment information D4b2 includes information on whether or not to adjust the voltage value at the start point of the waveform of the drive pulse PDb to be identical to the voltage value at the end point of the waveform of the drive pulse PDa. Therefore, if necessary, it is possible to adjust the voltage value at the start point of the waveform of the drive pulse PDb to be identical to the voltage value at the end point of the waveform of the drive pulse PDa. When such adjustment is performed, it is easier for the user to adjust the waveform of the drive pulse PDb than when the adjustment is not performed. However, when such adjustment is made to be uniform, the intention of the user may not be satisfied. Therefore, the adjustment information D4b2 is information for enabling selection of not performing such adjustment. This improves usability.

Furthermore, as described above, the respective waveforms of the drive pulse PDa and the drive pulse PDb include the first period P1, the second period P2, the third period P3, the fourth period P4, the fifth period P5, the sixth period P6, and the seventh period P7 from the start point to the end point in this order. The first period P1 is a period in which the potential is maintained at the intermediate potential Vc. The second period P2 is a period in which the potential is decreased from the intermediate potential Vc to the first potential VL lower than the intermediate potential Vc. The third period P3 is a period in which the potential is maintained at the first potential VL. The fourth period P4 is a period in which the potential is increased from the first potential VL to the second potential VH higher than the intermediate potential Vc. The fifth period P5 is a period in which the potential is maintained at the second potential VH. The sixth period P6 is a period in which the potential is decreased from the second potential VH to the intermediate potential Vc. The seventh period P7 is a period in which the potential is maintained at the intermediate potential Vc. With such a waveform, when the drive element 211 is a piezoelectric element, there is an advantage that it is easy to determine an appropriate waveform of the drive pulse PD and to perform the evaluation for the determination.

Further, as described above, the adjustment information D4b2 is information regarding whether or not to adjust the intermediate potential Vcb of the waveform of the drive pulse PDb to be identical to the intermediate potential Vca of the waveform of the drive pulse PDa. Therefore, if necessary, it is possible to adjust the intermediate potential Vcb of the waveform of the drive pulse PDb to be identical to the intermediate potential Vca of the waveform of the drive pulse PDa. When such adjustment is performed, it is easier for the user to adjust the waveform of the drive pulse PDb than when the adjustment is not performed. However, when such adjustment is made to be uniform, the intention of the user may not be satisfied. Therefore, the adjustment information D4b2 is information for enabling selection of not performing such adjustment. As a result, the usability is improved in comparison to a configuration in which such selection is not possible.

Furthermore, as described above, the information processing apparatus 400 further includes the fourth reception unit 451d. The fourth reception unit 451d receives an input of adjustment information D4b1, which is an example of "fourth information". The adjustment information D4b1 is information used when determining the waveform of the drive pulse PDa, and is information regarding whether or not to adjust at least a portion of the waveform of the drive pulse PDa to be identical to an element of the waveform of the drive pulse PDb. Therefore, when the waveform of the drive pulse PDa is determined or the evaluation for the determination is performed, if necessary, it is possible to adjust at least a portion of the waveform of the drive pulse PDa to be identical to the element of the waveform of the drive pulse PDb. Therefore, it is possible to reduce the labor of the user when the waveform of the drive pulse PDa is determined or the evaluation for the determination is performed.

As described above, when the adjustment information D4b2 received by the third reception unit 451c indicates that at least a portion of the waveform of the drive pulse PDb is adjusted to be identical to the element of the waveform of the drive pulse PDa, the fourth reception unit 451d does not permit reception of the input of the adjustment information D4b2. Therefore, it is possible to smoothly adjust at least a portion of the waveform of the drive pulse PDb to be identical to the element of the waveform of the drive pulse PDa.

Furthermore, as described above, the information processing apparatus 400 further includes the fifth reception unit 451e. The fifth reception unit 451e receives an input of waveform information D4a3, which is an example of "fifth information". The waveform information D4a3 is information for determining the third waveform different from the waveforms of the drive pulse PDa and the drive pulse PDb, as the waveform of the drive pulse PD. Therefore, it is possible to determine the third waveform as the waveform of the drive pulse PD and to perform the evaluation for the determination.

Further, as described above, the adjustment information D4b2 selectively indicates any one of a case where at least a portion of the waveform of the drive pulse PDb is adjusted to be identical to the element of the waveform of the drive pulse PDa, a case where at least a portion of the waveform of the drive pulse PDb is adjusted to be identical to the element of the third waveform, and a case where at least a portion of the waveform of the drive pulse PDb is not adjusted to be identical to any element of the waveform of the drive pulse PDa and the third waveform. Therefore, if necessary, it is possible to adjust at least a portion of the waveform of the drive pulse PDb to be identical to the waveform of the drive pulse PDa or the elements of the third waveform.

Furthermore, as described above, the waveform of the drive pulse PDa is a waveform for forming dots of the first size with the ink discharged from the liquid discharge head 210. The waveform of the drive pulse PDb is a waveform for forming dots of the second size larger than the first size, with the ink discharged from the liquid discharge head 210. Therefore, it is possible to determine the respective waveforms of the drive pulse PDa and the drive pulse PDb for enhancing the gradation and to perform the evaluations for the determination.

As described above, when the adjustment information D4b2 is information regarding whether or not to adjust the maximum potential (second potential VHb) of the waveform of the drive pulse PDb to be identical to the maximum potential (second potential VHa) of the waveform of the drive pulse PDa, if necessary, it is possible to adjust the maximum potential of the waveform of the drive pulse PDb to be identical to the maximum potential of the waveform of the drive pulse PDa. When such adjustment is performed, it is easier for the user to adjust the waveform of the drive pulse PDb than when the adjustment is not performed. However, when such adjustment is made to be uniform, the intention of the user may not be satisfied. Therefore, the adjustment information D4b2 is information for enabling selection of not performing such adjustment. As a result, the usability is improved in comparison to a configuration in which such selection is not possible.

Further, as described above, when the adjustment information D4b2 is information regarding whether or not to adjust the time length of the waveform of the drive pulse PDb to be identical to the time length of the waveform of the drive pulse PDa, if necessary, it is possible to adjust the time length of the waveform of the drive pulse PDb to be identical to the time length of the waveform of the drive pulse PDa. When such adjustment is performed, it is easier for the user to adjust the waveform of the drive pulse PDb than when the adjustment is not performed. However, when such adjustment is made to be uniform, the intention of the user may not be satisfied. Therefore, the adjustment information D4b2 is information for enabling selection of not performing such adjustment. As a result, the usability is improved in comparison to a configuration in which such selection is not possible.

Further, as described above, each of the first reception unit 451a, the second reception unit 451b, and the third reception unit 451c causes the display device 410 to display an image for inputting information. Therefore, it is possible to provide the user with the GUIs for inputting the waveform information D4a1, the waveform information D4a2, and the adjustment information D4b2. As a result, it is possible to improve the usability in comparison to a configuration that does not use the display device 410.

7. Modification Example

Each form described above may be variously modified. Specific modifications that can be applied to each of the above-described forms are exemplified below. Two or more forms freely selected from the following examples can be combined in a range without contradictory.

7-1. Modification Example 1

In the above-described embodiment, the configuration in which the program P is executed by the processing circuit provided in the same apparatus as the installed storage circuit has been described, but the present disclosure is not limited to this. The program P may be executed by a processing circuit provided in an apparatus different from the installed storage circuit. For example, the program P stored in the storage circuit 440 of the information processing apparatus 400 may be executed by the processing circuit 280 of the liquid discharge apparatus

What is claimed is:

1. An information processing apparatus used to determine a waveform of a drive pulse applied to a drive element provided in a liquid discharge head for discharging a liquid, the apparatus comprising:
   a first reception unit that receives an input of first information by a user for determining a first waveform as the waveform of the drive pulse;
   a second reception unit that receives an input of second information by a user for determining a second waveform different from the first waveform, as the waveform of the drive pulse;
   a fifth reception unit that receives an input of fifth information by a user for determining a third waveform different from the first waveform and the second waveform, as the waveform of the drive pulse; and
   a third reception unit that displays third information options, and selectively receives from a user third information indicating at least one of a first of the third information options indicating adjustment of at least a portion of the second waveform to be identical to a portion of the first waveform, a second of the third information options indicating adjustment of at least a portion of the second waveform to be identical to a portion of the third waveform, and a third of the third information options indicating non-adjustment of at least a portion of the second waveform to be identical to any of portions of the first waveform and the third waveform, the third information being used when the second waveform is determined.

2. The information processing apparatus according to claim 1, wherein the third information includes information regarding whether or not to adjust a voltage value at a start point of the second waveform to be identical to a voltage value at an end point of the first waveform.

3. The information processing apparatus according to claim 2, wherein
each of the first waveform and the second waveform includes, between a start point and an end point,
a first period in which a potential is maintained at an intermediate potential,
a second period in which the potential is decreased from the intermediate potential to a first potential lower than the intermediate potential,
a third period in which the potential is maintained at the first potential,
a fourth period in which the potential is increased from the first potential to a second potential higher than the intermediate potential,
a fifth period in which the potential is maintained at the second potential,
a sixth period in which the potential is decreased from the second potential to the intermediate potential, and
a seventh period in which the potential is maintained at the intermediate potential, in this order.

4. The information processing apparatus according to claim 3, wherein
the third information is information by a user, the third information regarding whether or not to adjust the intermediate potential of the second waveform to be identical to the intermediate potential of the first waveform.

5. The information processing apparatus according to claim 1, further comprising:
a fourth reception unit that receives an input of fourth information by a user, the fourth information regarding whether or not to adjust at least a portion of the first waveform to be identical to a portion of the second waveform, the fourth information being used when the first waveform is determined.

6. The information processing apparatus according to claim 5, wherein
when the third information received by the third reception unit indicates that at least a portion of the second waveform is adjusted to be identical to a portion of the first waveform, the fourth reception unit does not permit reception of the input of the fourth information.

7. The information processing apparatus according to claim 1, wherein
the first waveform is a waveform for forming a dot having a first size with the liquid discharged from the liquid discharge head, and
the second waveform is a waveform for forming a dot having a second size larger than the first size with the liquid discharged from the liquid discharge head.

8. The information processing apparatus according to claim 1, wherein
the third information is information regarding whether or not to adjust a maximum potential of the second waveform to be identical to a maximum potential of the first waveform.

9. The information processing apparatus according to claim 1, wherein
the third information is information regarding whether or not to adjust a time length of the second waveform to be identical to a time length of the first waveform.

10. The information processing apparatus according to claim 1, wherein
each of the first reception unit, the second reception unit, and the third reception unit causes a display device to display an image for inputting information.

11. The information processing apparatus according to claim 1, wherein the first information comprises measurement conditions for acquiring a pickup image of a scattering state of the liquid discharge from the liquid discharge head.

12. The information processing apparatus according to claim 1, wherein the first information comprises measurement conditions for acquiring a stability state of the liquid discharge from the liquid discharge head.

13. An information processing apparatus used to determine a waveform of a drive pulse applied to a drive element provided in a liquid discharge head for discharging a liquid, the apparatus comprising:
a first reception unit that receives an input of first information by a user for determining a first waveform as the waveform of the drive pulse;
a second reception unit that receives an input of second information by a user for determining a second waveform different from the first waveform, as the waveform of the drive pulse;
a fifth reception unit that receives an input of fifth information by a user for determining a third waveform different from the first waveform and the second waveform, as the waveform of the drive pulse; and
a third reception unit that receives an input of third information by a user, wherein the third information selectively indicates any of adjustment of at least a portion of the second waveform to be identical to an element of the first waveform, adjustment of at least a portion of the second waveform to be identical to an element of the third waveform, and non-adjustment of at least a portion of the second waveform to be identical to any of elements of the first waveform and the third waveform, the third information being used when the second waveform is determined,
a fourth reception unit that receives an input of fourth information by a user, the fourth information regarding whether or not to adjust at least a portion of the first waveform to be identical to an element of the second waveform, the fourth information being used when the first waveform is determined, and
when the third information received by the third reception unit indicates that at least a portion of the second waveform is adjusted to be identical to an element of the first waveform, the fourth reception unit does not permit reception of the input of the fourth information.

* * * * *